(12) United States Patent
Tsukuda et al.

(10) Patent No.: US 8,302,119 B2
(45) Date of Patent: Oct. 30, 2012

(54) OPTICAL INFORMATION RECORDING MEDIUM

(75) Inventors: Masahiko Tsukuda, Osaka (JP); Morio Tomiyama, Nara (JP); Kenji Narumi, Osaka (JP); Joji Anzai, Osaka (JP); Yuuko Tomekawa, Osaka (JP); Haruhiko Habuta, Osaka (JP)

(73) Assignee: Panasonic Corporation, Osaka (JP)

( * ) Notice: Subject to any disclaimer, the term of this patent is extended or adjusted under 35 U.S.C. 154(b) by 555 days.

(21) Appl. No.: 12/531,601

(22) PCT Filed: Mar. 13, 2008

(86) PCT No.: PCT/JP2008/000559
§ 371 (c)(1),
(2), (4) Date: Sep. 16, 2009

(87) PCT Pub. No.: WO2008/129780
PCT Pub. Date: Oct. 30, 2008

(65) Prior Publication Data
US 2010/0110871 A1 May 6, 2010

(30) Foreign Application Priority Data
Mar. 19, 2007 (JP) ................. 2007-069978

(51) Int. Cl.
G11B 7/26 (2006.01)
G11B 3/70 (2006.01)

(52) U.S. Cl. ...................... 720/695; 369/284

(58) Field of Classification Search .......... 369/284; 720/695, 725, 718
See application file for complete search history.

(56) References Cited

U.S. PATENT DOCUMENTS

| 7,876,664 B2* | 1/2011 | Tsukagoshi et al. ....... 369/275.1 |
| 2004/0139459 A1 | 7/2004 | Mishima et al. |
| 2006/0062133 A1 | 3/2006 | Tsukagoshi et al. |
| 2007/0058516 A1 | 3/2007 | Watabe et al. |
| 2010/0195474 A1* | 8/2010 | Tsukuda et al. ......... 369/112.23 |

FOREIGN PATENT DOCUMENTS

| JP | 2001-155380 | 6/2001 |
| JP | 2004-213720 | 7/2004 |
| JP | 2005-285222 | 10/2005 |
| JP | 2006-73053 | 3/2006 |
| JP | 2007-80303 | 3/2007 |

OTHER PUBLICATIONS

International Search Report issued Jun. 24, 2008 in International (PCT) Application No. PCT/JP2008/000559.

* cited by examiner

*Primary Examiner* — Allen Cao
(74) *Attorney, Agent, or Firm* — Wenderoth, Lind & Ponack, L.L.P.

(57) ABSTRACT

The recording/reproducing quality of a multilayer optical information recording medium deteriorate not only due to interference from other layers caused by light converging on other information layers but also due to stray light converging on the surface of a protective layer and stray light that does not converge on other information layers but rather returns to an optical head through the same optical path as the reproducing signal. The thickness composition of intermediate layers (106, 107, and 108) and the protective layer (109) in a four-layer optical information recording medium are set so as to eliminate the influence of interference caused by stray light from other layers reflected up to three times.

19 Claims, 16 Drawing Sheets

Dust Occupancy: 1.3%

Size of Built-up Dust: 5-20 μm

OPTICAL INFORMATION RECORDING MEDIUM

TECHNICAL FIELD

The present invention relates to an optical information recording medium that records/reproduces information such as audio/video and the like as a digital signal by irradiating a thin film formed on a substrate with a high-energy optical beam such as a laser beam, and particularly relates to an optical information recording medium capable of recording/reproducing large amounts of information through multilayering of the information layers.

BACKGROUND ART

Research in optical information recording methods has been advancing in recent years, and such methods have come to be used widely in industrial and consumer applications. In particular, optical information recording media capable of recording information at high densities, such as CDs and DVDs, have become widespread. Such optical information recording media are constructed by layering thin metal films or thermally-recordable thin film materials upon a transparent substrate in which is formed pits expressing an information signal, concavo-convex channels such as guidance grooves for tracking of recording/reproducing light, and so on, and furthermore layering thereupon a protective layer, such as a resin layer or a transparent substrate, that protects the thin metal film or thin film material from atmospheric moisture. The reproducing of information is carried out by irradiating the thin metal film or thin film material with laser light and detecting changes in the amount of the resulting reflected light.

The method for manufacturing such an optical information recording medium is generally performed as follows.

For example, with a CD, a resin substrate having a concavo-convex form expressing information signals on one surface is formed through injection molding or the like using a mold, called a "stamper", that has a concavo-convex channel pattern on its surface. A thin metal film or thin film material is then formed upon the concavo-convex channels through deposition, sputtering, or the like, after which a protective layer is formed by coating the film with an ultraviolet light-curable resin, thereby completing the manufacture.

With a DVD, a resin substrate approximately 0.6 mm thick is formed through injection molding or the like using a stamper, after which a thin metal film or thin film material is formed upon the concavo-convex form on the resin substrate. This is then laminated onto a separately-prepared resin substrate, approximately 0.6 mm thick, using ultraviolet light-curable resin or the like, thereby completing the manufacture.

Such optical information recording media are seeing increased demand for higher capacities, and due to such demand, higher densities in optical information recording media are being sought. Dual-layer optical information recording medium constructions, in which two signal layers, each formed of concavo-convex channels and a thin metal film or thin film material, are constructed so as to sandwich an intermediate layer tens of µm thick, are offered for the aforementioned DVDs as well, with the goal of increasing the capacity thereof.

Furthermore, next generation optical information recording media, having higher densities and higher capacities than DVDs, are in demand due to the recent spread of digital high-definition broadcasting, and thus high-capacity media such as Blu-ray disks are being offered. Compared to DVDs, the track pitch in the information layers formed in concavo-convex form is narrower in Blu-ray disks, and the pits are smaller as well. It is therefore necessary to concentrate the laser spot used to record/reproducing information into a smaller area on the information layer. With Blu-ray disks, a violet laser whose laser light wavelength is a short 405 nm is used, and the laser light spot is concentrated into a small area on the information layer by using an optical head equipped with an objective lens for laser light concentration whose numerical aperture (NA) is 0.85. However, a smaller spot increases the influence of disk tilt. Aberration will occur in the beam spot with even a slight tilt in the disk, causing distortion in the concentrated beam; this results in a problem in that recording/reproducing cannot be performed. This drawback is circumvented in Blu-ray disks by reducing the protective layer on the laser light-entry side of the disk to a thickness of approximately 0.1 mm.

Meanwhile, in recording/reproducing systems that use optical heads having this sort of objective lens with a high NA, aberration, such as spherical aberration arising due to variations in the thickness from the outer surface of the disk to the information layer, exerts a great influence on the quality of the laser light concentrated onto the information layer. A means for correcting aberration arising due to thickness variations is therefore provided. For example, a configuration that provides a spherical aberration correction means using a combination lens in the optical head, a configuration that provides a spherical aberration correction means using liquid-crystals in the optical head, and so on have been proposed.

Meanwhile, still higher capacities are being demanded even in such high-capacity next-generation optical information recording media such as Blu-ray disks, and thus, as with DVDs, increasing capacity through the multilayering of information layers is being proposed as one such method. In order to reduce the influence of disk tilt when multilayering information layers in a Blu-ray disk, it is necessary for distance to the information layer furthest from the laser light-entry side to be approximately 0.1 mm from the surface of the disk, as with single-layer media. For this reason, the information layers are layered so as to sandwich a transparent layer called an intermediate layer, whose thickness is several µm to several tens of µm, all within a space approximately 0.1 mm thick.

Accordingly, the method of manufacture for a multilayer Blu-ray disk is generally performed as follows. A method of manufacturing a dual-layer optical information recording medium, having two information layers, shall be described as an example. This method includes a step of forming a thin metal film, a thermally-recordable thin film material, or the like upon a molded resin substrate, approximately 1.1 mm thick, having pits, guidance grooves, and so on in a concavo-convex form on one side, thereby forming a first information layer; a step of forming an intermediate layer several µm to several tens of µm thick upon the information layer on the substrate, in order to separate the information layers; a step of transferring pits, guidance grooves, or the like onto the upper side of the intermediate layer by pressing the intermediate layer with a stamper having a concavo-convex form corresponding to the pits, guidance grooves, and so on; a step of forming a thin metal film or thermally-recordable thin film material, the film being semitransparent with respect to the wavelength of the laser light used for recording/reproducing, upon the pits, guidance grooves, or the like transferred onto the intermediate layer, thereby forming a second information layer; and a step of forming a protective layer upon the second information layer in order to protect the second information layer. When multilayering more than two layers, those multiple information layers can be layered sequentially by repeating the steps from the formation of the intermediate layer to the formation of the second information layer several times.

As mentioned earlier, with multilayer Blu-ray disk media constructed in this manner, all information layers are required to be provided within a space approximately 0.1 mm thick in order to reduce the influence of disk tilt. Thus, as shown in FIG. 2, the distance to a first information layer 202, which is furthest from the outermost surface on the recording/reproducing light-entry side, is restricted to approximately 0.1 mm, and the other information layers are layered thereupon moving outward toward the recording/reproducing light-entry side.

While dual-layer media are well-known as such multilayered media, structures having three or more layers are being proposed as of late. In particular, four-layer media, which have four information layers, have been introduced.

When recording/reproducing light is focused onto the information layer to be recorded to/reproduced in an optical information recording medium having multiple information layers, part of the light that has been reflected by another information layer and that is not involved in the recording/reproducing of information (this light is called "stray light" here) is reflected in multiple by one of the information layers. When the stray light returns to the optical head via the same optical path as the reflected light from the information layer being recorded to/reproduced (this reflected light is called "information light" here), the stray light interferes with the information light to be read out, causing major fluctuations in the light amount. Problems caused by such interference are particularly apparent in multilayer media composed of three or more information layers. Light amount fluctuations caused by stray light reflected in multiple returning to the optical head along the same optical path as the information light to be read out shall be referred to here as a "back-focus issue". Various investigations are being made with respect to the elimination of such back-focus issues.

For example, Patent Document 1 proposes a structure in which the thickness of each intermediate layer is designed so that when light is focused on an information layer to be read, the light does not converge on other information layers. This document particularly discloses a structure in which the thicknesses from one of the information layers to another one of the information layers on the inner side and the thicknesses from that one information layer to one of the information layers on the protective layer side are all different. Making the intermediate layers thicker (or thinner) the further away they are from the recording/reproducing light-entry side is proposed as a way to realize such a structure; this prevents light from converging on other information layers when focusing on the information layer to be read.

In addition, Patent Document 2, for example, discloses a structure for a multilayer medium having three or more information layers in which the intermediate layers are composed having different thicknesses in order to eliminate the influence of crosstalk between information layers (interlayer crosstalk). This document particularly discloses a structure for a four-layer medium having four information layers, in which, when the structure has three intermediate layers, or first, second, and third intermediate layers, that are layered starting with the first intermediate layer, which is furthest from the recording/reproducing light-entry side, and moving out toward the recording/reproducing light-entry side, the second information layer has the highest thickness, thereby preventing stray light from being focused upon other information layers.

[Patent Document 1] JP 2001-155380A
[Patent Document 2] JP 2004-213720A

DISCLOSURE OF INVENTION

However, it has come to be understood that the patterns with which back-focus issues arise are not limited to the case where the stray light occurring when light is focused upon one of the information layers converges on another information layer, as discussed in Patent Document 1 or Patent Document 2. For example, in addition to the pattern shown in FIG. 3(a), in which stray light 302 converges upon one of the information layers, it is known that major fluctuations in the light amount also occur in a pattern, shown in FIG. 3(b), where stray light 304 converges upon the surface of the protective layer, as well as a pattern, shown in FIG. 3(c), where stray light 306 and 307 converge upon neither an information layer nor the protective layer but do return along almost the same optical path as information light 305.

Furthermore, when manufacturing a dual-layer optical information recording medium, a four-layer optical information recording medium, or the like, the intermediate layers separating the information layers, the protective layer, and so on are generally formed using a spin coat method or the like on ultraviolet light-curable resin, and thus when forming an intermediate layer or a protective layer thereby, it is necessary for the thickness distribution across the entire surface of the medium to be at least approximately ±2 μm, including lot-to-lot variability.

It is furthermore absolutely necessary to ensure that four-layer Blu-ray disks are compatible with the single-layer and dual-layer Blu-ray disks currently being sold, and thus the thickness from the furthest information layer to the protective layer surface when viewed from the recording/reproducing light-entry side is restricted to approximately 0.1 mm.

When the thickness composition of the intermediate layers and protective layer are taken into consideration along with the manufacturing margin for such optical information recording media, it becomes apparent that the thickness compositions of the intermediate layers and protective layer disclosed in Patent Document 1 and Patent Document 2 cannot completely eliminate the back-focus issues.

Having been conceived as a solution to the back-focus issues occurring in the thickness compositions proposed above, it is an object of the present invention to provide a thickness composition for intermediate layers and a protective layer that eliminates the back-focus issues that affect the electric signal properties of an optical information recording medium, while ensuring compatibility with the single-layer and dual-layer Blu-ray disks currently being sold and taking into consideration the manufacturing margin for such optical information recording media.

The present invention proposes a thickness composition for intermediate layers and a protective layer in a multilayer optical information recording medium having three or more information layers that solves back-focus issues while affording a manufacturable margin and ensuring compatibility with single-layer and dual-layer structures.

Specifically, the present invention is as follows.

An optical information recording medium according to the present invention has at least three information layers, at least two intermediate layers separating the information layers, and a protective layer layered upon a substrate, the optical information recording medium being recorded and/or reproduced from the side of the protective layer using an optical head. The round-trip optical path length difference between information light returning to the optical head from one of the information layers upon which recording/reproducing light is focused and reflected stray light that is a part of stray light reflected by one of the information layers that returns to the optical head having been reflected by the information layer or the surface of the protective layer no more than three times is no less than 2 μm.

Preferably, the sum of the thicknesses of the intermediate layers differs from the thickness of the protective layer.

Preferably, the thicknesses of each of the intermediate layers and the protective layer differ from one another, and the difference between each thickness is no less than 1 μm.

Preferably, the thickness variability of each of the intermediate layers is within ±2 μm.

Preferably, the optical information recording medium comprises a first information layer provided upon the substrate, a first intermediate layer provided upon the first information layer, a second information layer provided upon the first intermediate layer, a second intermediate layer provided upon the second information layer, a third information layer provided upon the second intermediate layer, a third intermediate layer provided upon the third information layer, a fourth information layer provided upon the third intermediate layer, and the protective layer provided upon the fourth information layer, with the second intermediate layer being the thinnest of the first through third intermediate layers.

Preferably, the optical information recording medium comprises a first information layer provided upon a substrate, a first intermediate layer provided upon the first information layer, a second information layer provided upon the first intermediate layer, a second intermediate layer provided upon the second information layer, a third information layer provided upon the second intermediate layer, and the protective layer provided upon the third information layer, with the second intermediate layer being thinner than the first intermediate layer.

Preferably, the thickness of each intermediate layer is no less than 16 μm and no more than 37 μm.

Preferably, the thickness of the protective layer is no less than 43 μm and no more than 59 μm.

Preferably, the thickness of the first intermediate layer is no less than 23 μm and no more than 27 μm, the thickness of the second intermediate layer is no less than 16 μm and no more than 20 μm, and the thickness of the protective layer is no less than 55 μm and no more than 59 μm.

Preferably, the thickness of the first intermediate layer is no less than 23 μm and no more than 27 μm, the thickness of the second intermediate layer is no less than 18 μm and no more than 22 μm, and the thickness of the protective layer is no less than 53 μm and no more than 57 μm.

Preferably, the thickness of the first intermediate layer is no less than 33 μm and no more than 37 μm, the thickness of the second intermediate layer is no less than 18 μm and no more than 22 μm, and the thickness of the protective layer is no less than 43 μm and no more than 47 μm.

Preferably, the difference between the thickness of the first intermediate layer and the thickness of the second intermediate layer is more than 1 μm.

Preferably, the difference between the thickness of the first intermediate layer and the total thickness of the second intermediate layer and protective layer is more than 1 μm.

Preferably, the difference between the total thickness of the first and second intermediate layers and the total thickness of the protective layer is more than 1 μm.

Preferably, the difference between the thickness of the second intermediate layer and the thickness of the protective layer is more than 1 μm.

Preferably, the difference between the thickness of the first intermediate layer and the thickness of the protective layer is more than 1 μm.

Preferably, the thickness between an information layer A and an information layer B on the light entry side of the information layer A and the thickness between the information layer B and an information layer C on the light entry side of the information layer B or the surface of the protective layer are different by more than 1 μm. This is because with such a structure, when information light is focused on the information layer A, the round-trip optical path length difference between the information light that returns to the optical head from the information layer A and the stray light that returns to the optical head after being reflected in order from the information layer B→the information layer C or the protective layer surface→the information layer B is sufficiently long.

Note that the information layer A may be any of the fourth through the second information layers, counted in from the light entry side. Meanwhile, the information layer B may be any of the third through the first information layers, counted in from the light entry side. Finally, the information layer C may be any of the second through the first information layers, counted in from the light entry side.

Preferably, the thickness between an information layer a and an information layer b on the light entry side of the information layer a and the thickness between an information layer c on the light entry side of the information layer b and an information layer d on the light entry side of the information layer c or the surface of the protective layer are different by more than 1 μm. This is because with such a structure, when information light is focused on the information layer a, the round-trip optical path length difference between the information light that returns to the optical head from the information layer a and the two incidences of stray light discussed below is sufficiently long. The first stray light returns to the optical head having been reflected by the information layer b→the information layer d or the protective layer surface→the information layer c, in that order. The second stray light returns to the optical head having been reflected three times, by the information layer c→the information layer d or the protective layer surface→the information layer b, in that order.

Note that the information layer a may be any of the fourth through the third information layers, counted in from the light entry side. Meanwhile, the information layers b and c may be any of the third through the first information layers, counted in from the light entry side.

Preferably, recording and/or reproducing is performed using an optical head including at least a laser light source having a wavelength of no less than 400 nm and no more than 410 nm, an objective lens having an NA of 0.85, and a spherical aberration correction element.

According to the present invention, a multilayer optical information recording medium composed of three or more information layers is capable of reducing the influence of interlayer crosstalk while maintaining compatibility with conventional single- and dual-layer optical information recording media, and can eliminate back-focus issues caused by interference between the information light and reflected stray light, in which some of the stray light reflected by other information layers when light is focused onto one of the information layers is reflected three times by other information layers or the protective layer surface and returns to the optical head, while affording a process margin sufficient for manufacturing intermediate layers, a protective layer, and so on.

Figure 1:
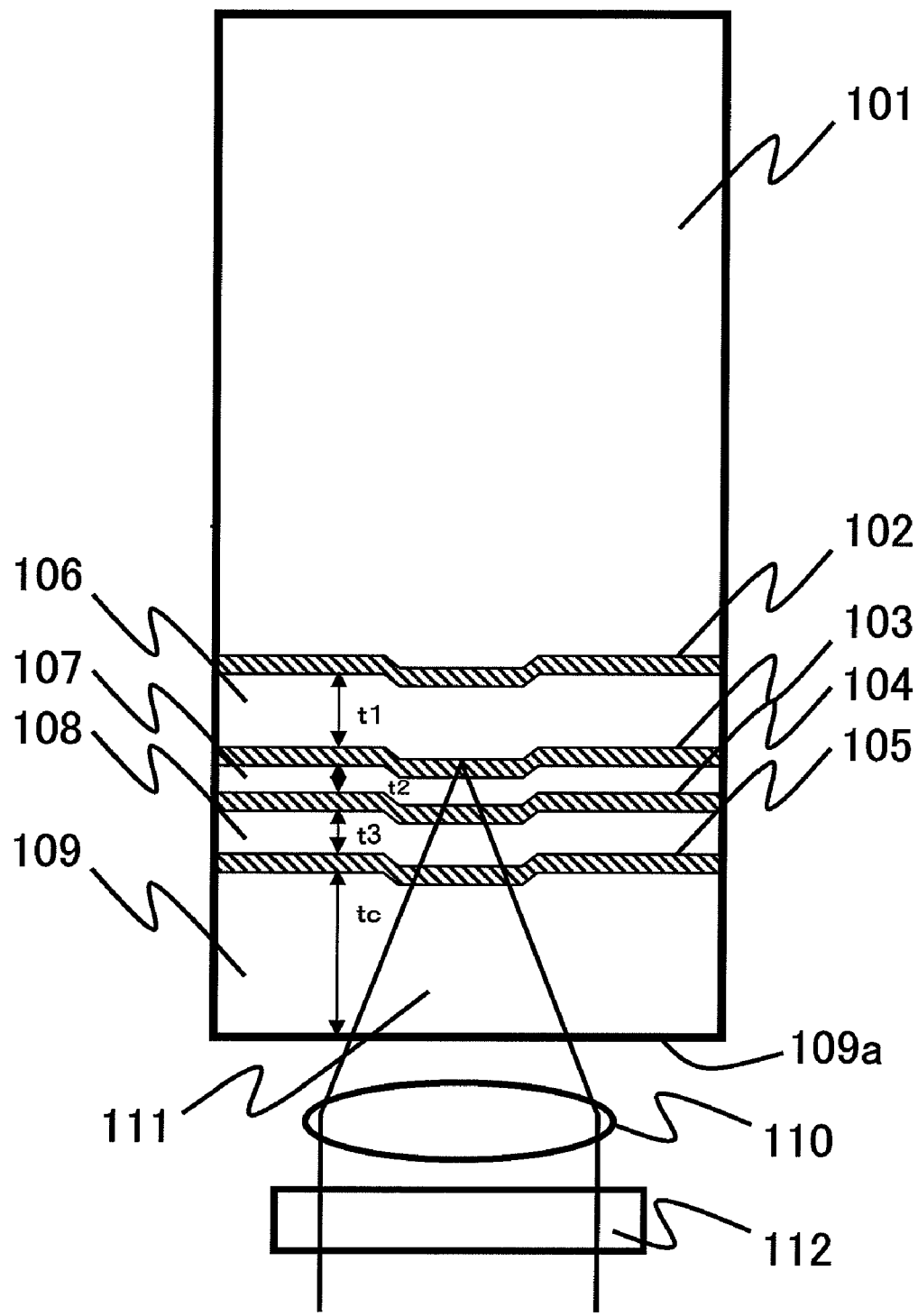
FIG. 1 is a diagram illustrating an exemplary structure of a multilayer optical information recording medium according to a first embodiment of the present invention.
Figure 2:
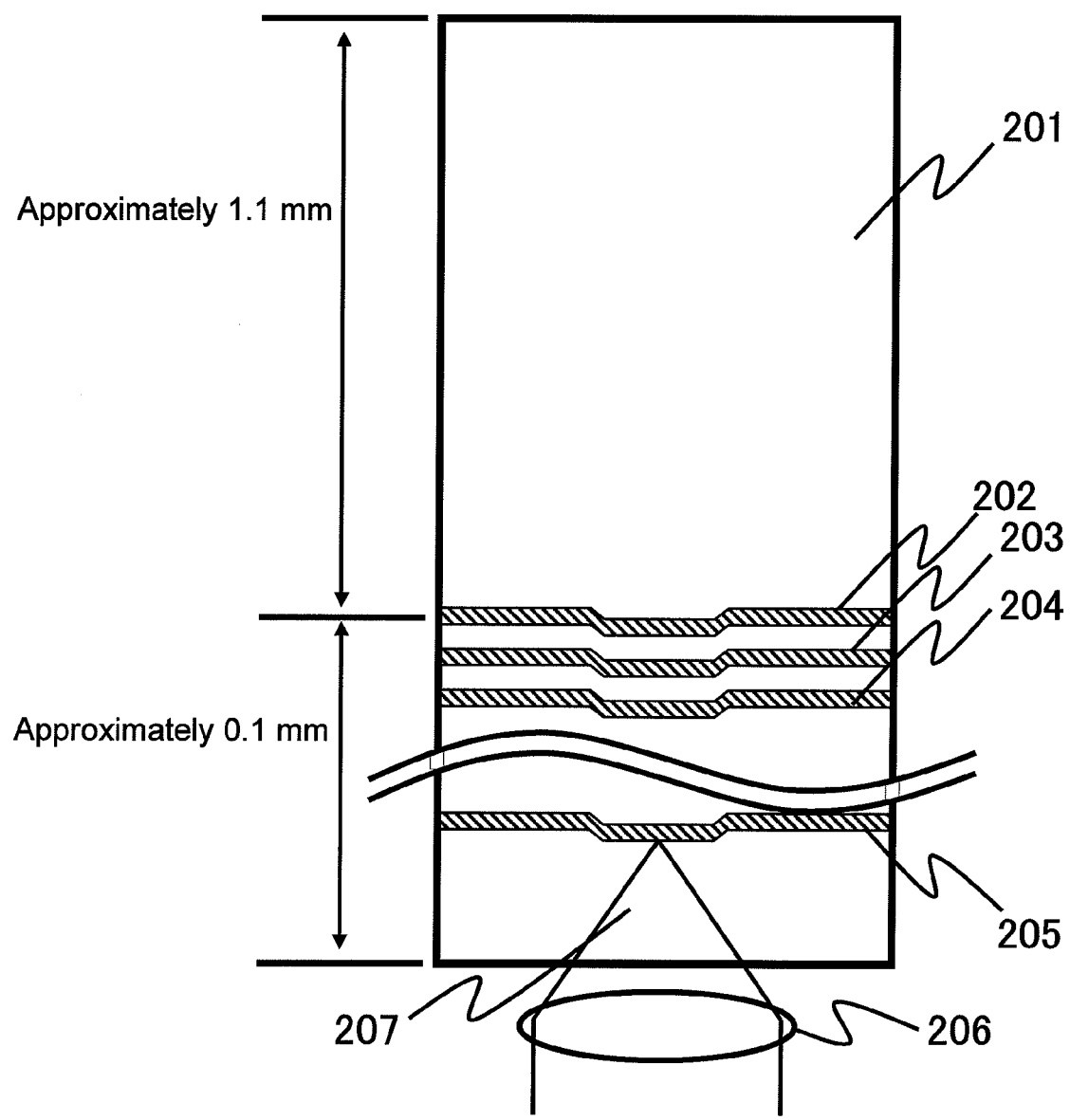
FIG. 2 is a diagram illustrating an example of a conventional structure of a multilayer optical information recording medium.

EXPLANATION OF REFERENCE 101 substrate
102 first information layer
103 second information layer
104 third information layer
105 fourth information layer
106 first intermediate layer
107 second intermediate layer
108 third intermediate layer
109 protective layer
110 objective lens
111 recording/reproducing light
112 aberration correction element
201 substrate
202 first information layer
203 second information layer
204 third information layer
205 N th information layer
206 objective lens
207 recording/reproducing light
301 optical path of information light to be read
302 optical path of stray light converging on third information layer
303 optical path of information light to be read
304 optical path of stray light converging on protective layer surface
305 optical path of information light to be read
306 optical path of stray light not converging on other information layers
307 optical path of stray light not converging on other information layers
701 substrate
702 second information layer
703 third information layer
704 first intermediate layer
705 protective layer
706 objective lens
707 recording/reproducing light
708 aberration correction element
1201 first information layer
1202 second information layer
1203 third information layer
1204 fourth information layer
1205 protective layer surface
1206 optical path of information light to be read
1207 optical path of stray light converging on third information layer
1208 optical path of information light to be read
1209 optical path of stray light not converging on other information layers
1210 optical path of information light to be read
1211 optical path of stray light reflected five times and then converging on second information layer
1401 first information layer
1402 second information layer
1403 third information layer
1404 fourth information layer
1405 protective layer surface
1406 optical path of information light to be read
1407 optical path of stray light
1701 optical information recording medium
1702 optical head
1703 light source
1704 recording/reproducing light
1705 collimate lens
1706 polarizing beam splitter
1707 quarter wave plate
1708 objective lens
1709 aperture
1710 detection lens
1711 cylindrical lens
1712 photod etector
1801 substrate
1802 first information layer
1803 second information layer
1804 third information layer
1805 first intermediate layer
1806 second intermediate layer
1807 protective layer
1808 objective lens
1809 recording/reproducing light
1810 aberration correction element

BEST MODE FOR CARRYING OUT THE INVENTION

Embodiments of the present invention shall now be described with reference to the drawings.

First Embodiment

FIG. 1 illustrates an exemplary configuration of a four-layer optical information recording medium according to a first embodiment of the present invention. The optical information recording medium examined here is a disk-shaped optical information recording medium with an outer diameter of approximately 120 mm and a thickness of approximately 1.2 mm, and FIG. 1 is a diagram illustrating a part of a cross section thereof.

The following descriptions discuss examination results for a write-once, four-layer optical information recording medium having information layers composed of a write-once phase change material. "Write-once phase change material" refers to a material that can take on two or more states having different optical properties by being heated through the irradiation of recording/reproducing light. Preferably, this is a material in which the stated reaction can result in an irreversible change. For example, a material containing 0 and M is preferable (where M is a single element or plural elements selected from Te, Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au, and Bi). A structure in which a dielectric material is also layered in addition to those materials is also preferable. However, the materials contained in the information layers are not limited to these materials. In addition, the effects of the present invention are the same even if a metal reflective film, such as Ag or Al alloys used in read-only media, is used rather than a write-once phase change material. Furthermore, the effects of the present invention are the same even if a phase change material capable of repeated recording is used.

A resin substrate 101 is a resin substrate, approximately 1.1 mm thick, made up of polycarbonate resin, and guidance grooves of a concavo-convex form are formed in one side thereof. The structure is such that a first information layer 102 containing a phase change recording material, a first intermediate layer 106 (thickness t1) composed of ultraviolet light-curable resin, a second information layer 103, a second intermediate layer 107 (thickness t2), a third information layer 104, a third intermediate layer 108 (thickness t3), a fourth information layer 105, and a protective layer 109 (thickness tc) are layered, in that order, upon the resin substrate 101. The external surface of the protective layer 109 is referred to as a protective layer surface 109a. Because it is necessary for the second information layer 103 to the fourth information layer 105 to both reflect recording/reproducing light and allow recording/reproducing light to pass through to the information layer furthest from the recording/reproducing light-entry side, those layers are composed of a thin film material that is semitransparent with respect to recording/reproducing light. Furthermore, the transmissibility and reflectance of each information layer is designed so that the amount of light reflected from each information layer to the optical head is approximately the same. For this reason, the materials are designed so that the transmissibility increases from the first information layer 102 to the fourth information layer 105.

The first intermediate layer 106 to the third intermediate layer 108 are formed through coating of an ultraviolet light-curable resin, which is cured after being pressed on one side with a stamper having guidance grooves of a concavo-convex form, and then transferring the concavo-convex form onto their surfaces following the removal of the stamper. The protective layer 109 is also formed through coating with an ultraviolet light-curable resin. It is preferable for the resin material used in the intermediate layers and protective layer to be approximately transparent with respect to the wavelength of the recording/reproducing light. "Approximately transparent" refers to a resin that preferably has a transmissibility of 90% or more for the wavelength of the recording/reproducing light. For example, a resin having a transmissibility of 90% or more for a wavelength of 405 nm is preferable.

Meanwhile, the optical head that records to/reproduces this optical information recording medium is configured with a 405 nm wavelength semiconductor laser as its light source, an objective lens 110 with an NA of 0.85, and an aberration correction element 112 configured of a combination lens.

Figure 17:
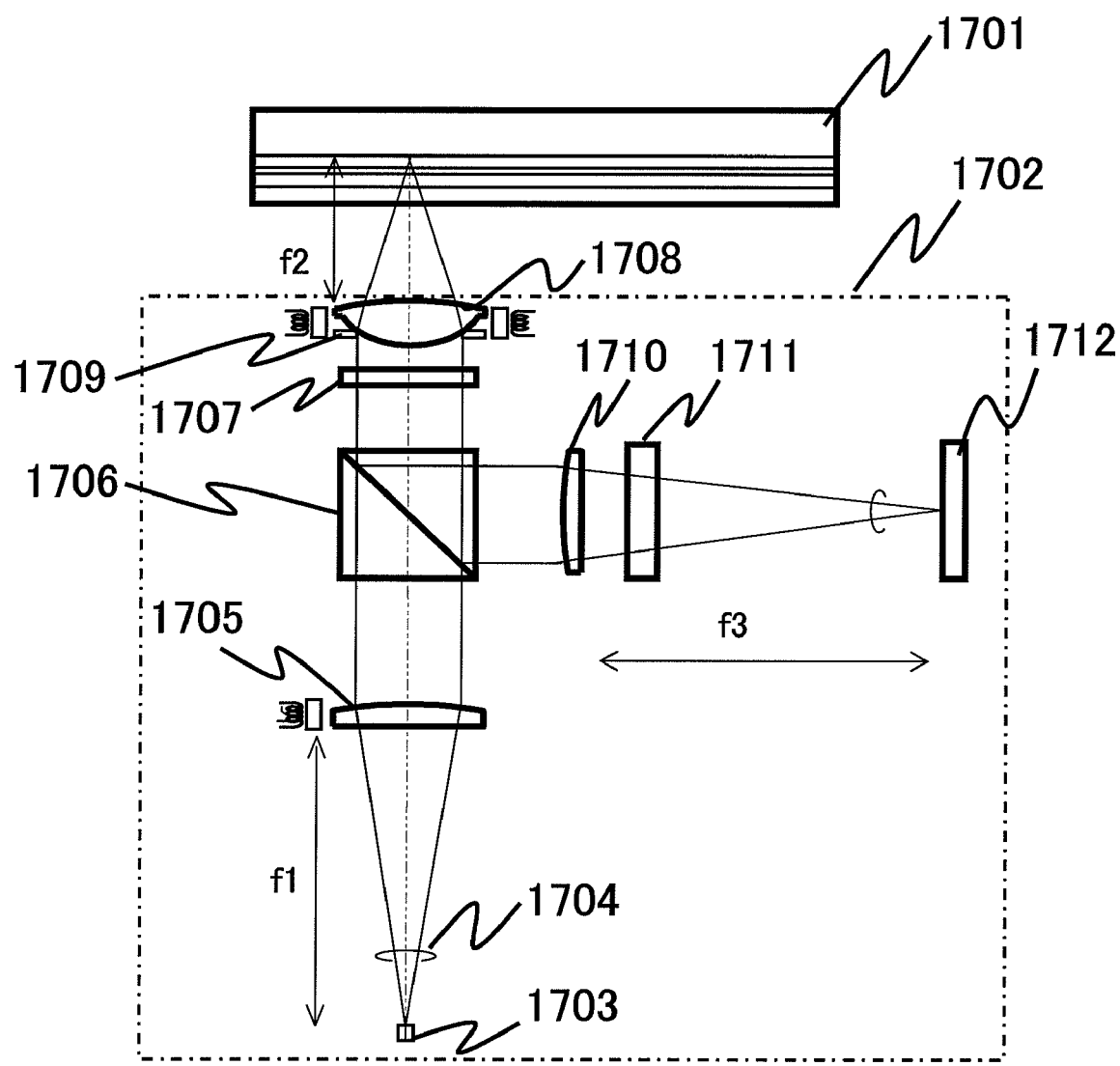
FIG. 17 is a diagram illustrating an exemplary configuration of an optical information recording medium and an optical head.

FIG. 17 illustrates exemplary configurations of an optical information recording medium 1701 and an optical head 1702 according to the first embodiment of the present invention.

A light source 1703 emits a divergent beam 1704 of linearly-polarized light with a wavelength of 405 nm. The beam 1704 emitted from the light source 1703 is transformed into parallel light by a collimate lens 1705 having a focal distance fl of 18 mm, and then passes through a polarizing beam splitter 1706; after then passing through a quarter wave plate 1707 and being transformed into circular polarized light, the beam 1704 is transformed into a convergent beam by an objective lens 1708 having a focal distance of 12 of 2 mm, and is then concentrated upon the optical information recording medium 1701. The aperture of the objective lens 1708 is restricted by an aperture 1709, which has a numerical aperture NA of 0.85. The collimate lens 1705 is adjusted in the direction of the optical axis using an aberration correction element configured of a stepping motor and the like, so that the spherical aberration on the information layer is approximately 0 mλ. The beam reflected by the information layer passes through the objective lens 1708 and the quarter wave plate 1707, is transformed into linearly-polarized light 90 degrees different from that in the round-trip path, and is then reflected by the polarizing beam splitter 1706. The beam reflected by the polarizing beam splitter 1706 is then divided by a diffraction grating, which is a beam dividing element, into a beam of zero-order light and first-order light, passes through a detection lens 1710 having a focal distance f3 of 30 mm and a cylindrical lens 1711, and enters into a photodetector 1712. The beam that enters the photodetector 1712 is given astigmatism upon passing through the cylindrical lens 1711.

The aberration correction element plays the part of adding aberration that counteracts aberration components arising in each information layer in order to correct aberration components, such as spherical aberration, arising due to differences in the thickness from the protective layer surface of the optical information recording medium to the information layer to/from which information is recorded/reproduced. Originally, this optical head has an optical design aimed at reducing the aberration for the information layer in a single-layer medium, and considering the recording/reproducing of up to a dual-layer medium, is set so that the position of minimum aberration, design-wise, is approximately 80 to 90 μm from the protective layer surface. For this reason, when concentrating recording/reproducing light onto information layers of different thicknesses from the position of minimum aberration, it is necessary for aberration correction values to be set and correction performed for each information layer by the aberration correction element.

Note that the wavelength of 405 nm for the semiconductor laser used as the light source is set with a permissible wavelength range of 400 nm to 410 nm, due to slight changes in the wavelength caused by the design or due to changes in temperature/driving current. The effects of the present invention do not change throughout the 400-to-410 nm wavelength range, and thus the same effects can be obtained.

The optimal design values with respect to the thicknesses of the intermediate layers and the protective layer was then considered, taking the thickness of the first intermediate layer 106 as t1, the thickness of the second intermediate layer 107 as t2, the thickness of the third intermediate layer 108 as t3, and the thickness of the protective layer 109 as tc.

Note that values measured using a thickness gauge having a confocal optical system are used as the thickness values mentioned here. This gauge is configured so as to concentrate a beam using an optical head having a 405 nm-wavelength light source, an objective lens, and an actuator onto an optical information recording medium and receive light reflected by that optical information recording medium using a photodetector having a pinhole in the previous stage. This creates an optical design whereby when the beam is focused on the boundary surface of the optical information recording medium, the beam is also focused on the surface of the photodetector; light passes through the pinhole provided in the stage previous to the photodetector only when the beam is focused on the boundary surface of the optical information recording medium, whereas a major portion of the light is blocked by the pinhole when the beam is focused on a position aside from the boundary surface of the optical information recording medium. Whether or not the beam is focused on the boundary surface of the optical information recording medium can be determined by measuring the optical intensity detected by the photodetector in this manner. The beam is focused on each information layer while using the actuator to move the optical head in the direction of the optical axis at which light enters the optical information recording medium, and each position that is in focus is calculated based on the distance the actuator has moved; each of these is taken as a thickness result. Note that this gauge is calibrated to measure an accurate thickness when the refraction index n with respect to the wavelength of 405 nm for the intermediate layers or protective layer is 1.6, and thus the optical thickness will vary depending on the value of the refraction index n of the material from which the intermediate layers and protective layer are formed. The thickness values discussed in the first embodiment of the present invention refer to thicknesses found when the refraction index n has been converted to 1.6.

"Thicknesses found when the refraction index n has been converted to 1.6" refers to the data measured by the stated thickness gauge when the refraction index n of each resin layer has been set to 1.6. Taking the refraction index n of the resin at a wavelength of 405 nm and the actual thickness as d (μm) when measuring the thicknesses of the resin layers using this thickness gauge, 1.6×d/n is obtained as the measured data when the refraction index is set to 1.6. In this specification, the "thickness value" refers to a value obtained by this thickness gauge (under these thickness measurement conditions). Discussions regarding thickness are therefore not concerned with the actual thickness d in this specification.

Next, variability in the thickness of the intermediate layers or protective layer when manufacturing a four-layer optical information recording medium were investigated. The desired thicknesses of the intermediate layers and protective layer were 24 μm for t1, 13 μm for t2, 18 μm for t3, and 45 μm for the thickness tc of the protective layer, with the thickness from the protective layer surface to the first information layer at 100 μm. Here, the intermediate layers and protective layer were manufactured using a process for coating an ultraviolet light-curable resin through a spin coat method.

Figure 4:
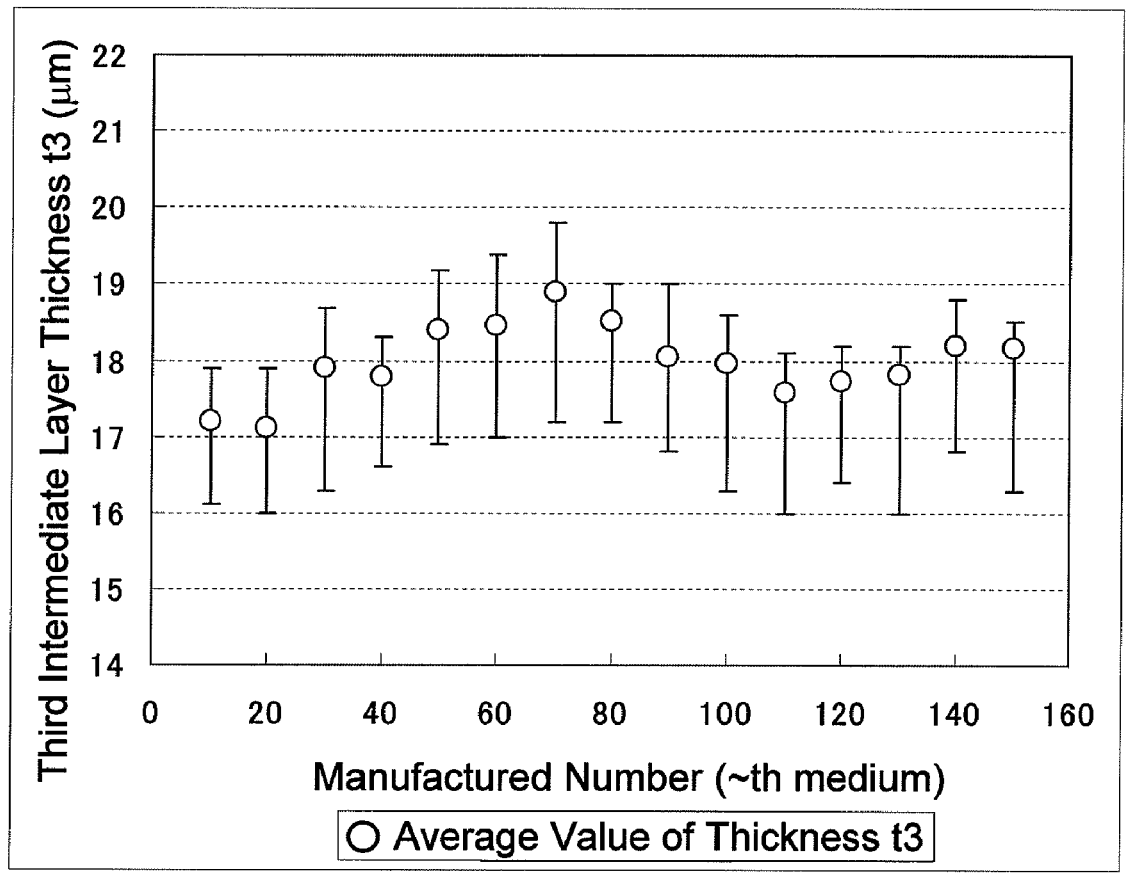
FIG. 4 is a diagram illustrating surface thickness distributions of a third intermediate layer and thickness fluctuations per manufacture sample.
Figure 5:
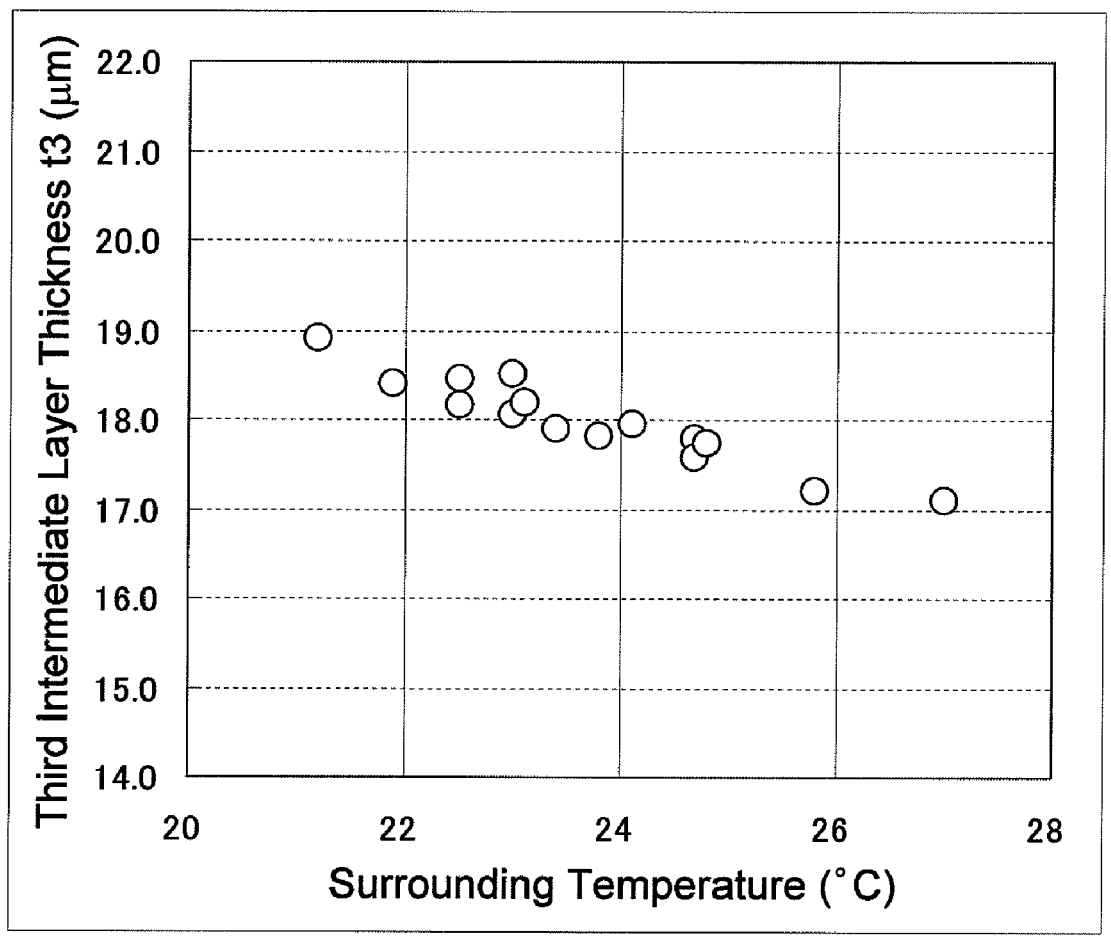
FIG. 5 is a diagram illustrating the relationship between the surrounding temperature of a coating apparatus and the average value of the surface thickness of a third intermediate layer.

FIG. 4 illustrates surface thickness distributions of the thickness t3 of the third intermediate layer and thickness fluctuations per manufacture sample, for the manufactured optical information recording medium. 150 samples were manufactured, and a single sample was removed every ten samples and the thickness of that sample's intermediate layer measured. FIG. 4 shows the average surface thickness value of the optical information recording medium and the maximum and minimum values in the surface using an error bar. As can be seen in FIG. 4, there are variabilities in the surface thickness from medium to medium. This is a thickness distribution that depends on thickness variations resulting from the spin coat method, such as thickness variations caused by differences in the radial centrifugal force exerted on the resin drawn out by the rotation of the spin table during spinning and thickness variations caused by the resin at the edges bulging outward due to the influence of surface tension in the resin coat edges after the spinning has been stopped, or due to the influence of resin flow occurring during pressing with a stamper following the resin coating; the distribution is approximately 3 μm depending on the state of differences between the maximum and minimum thicknesses throughout the entire surface of the medium. Various methods aside from the spin coat method can be considered as methods for forming the intermediate layers or protective layer, such as, for example, screen printing, gravure printing, and so on; however, although the shape of the thickness distribution is different, a thickness distribution of approximately 3 μm appears no matter what technique is used. Also, because this method includes a process of coating a liquid ultraviolet light-curable resin, the influence of the surrounding environment of the coating apparatus, and the influence of changes in the temperature and humidity in particular, is great. For example, the temperature of the ultraviolet light-curable resin increases with increase in the surrounding temperature, causing a drop in viscosity. When resin is coated using the spin coat method, for example, in such a state, the intermediate layer or protective layer that is formed will be thinner by the amount at which the viscosity dropped. Although adding a temperature adjustment function to the coating apparatus itself can reduce the degree of thickness fluctuations due to changes in temperature, the influence thereof cannot be completely eliminated; thus thickness variability appears among the optical information recording media as multiple optical information recording media are manufactured. FIG. 5 illustrates the relationship between the surrounding temperature of the coating apparatus and the average value of the surface thickness of the third intermediate layer. The data in FIG. 5 shows that a change in thickness of approximately 0.5 μm occurs for a temperature change of approximately 1° C. A change in thickness of approximately 1 μm arises between media even when the surrounding temperature is restricted to a change of approximately 1° C. by a temperature adjustment function. Including this thickness variability in the medium surface and thickness fluctuations between media results in the occurrence of a maximum variation of approximately 4 μm with respect to the desired thickness. For this reason, the thickness of each intermediate layer or the thickness of the protective layer have a process-related fluctuation factor of approximately ±2 μm with respect to the desired thickness. Although these descriptions focus only on the thickness t3 of the third intermediate layer, the same effects are obtained for the thickness t1 of the first intermediate layer, the thickness t2 of the second intermediate layer, and the thickness tc of the protective layer, and thus a thickness fluctuation range in the intermediate layers and protective layer of approximately ±2 μm with respect to the desired thickness can be expected. In other words, when mass-producing the optical information recording medium, it is possible that the thicknesses of the intermediate layers and protective layer are each off from the desired thickness by approximately ±2 μm, and thus it is necessary to take this fluctuation range into consideration when designing the thicknesses of the intermediate layers and protective layer of a four-layer medium.

Figure 6:
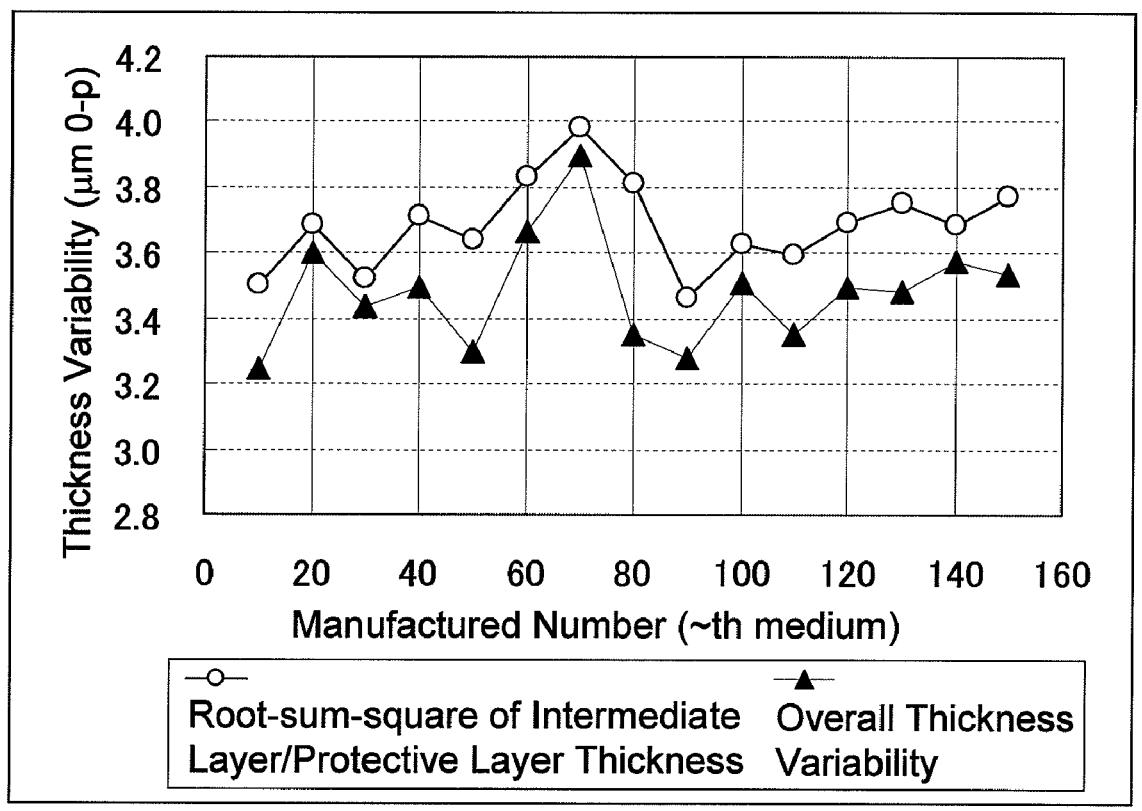
FIG. 6 is a diagram illustrating the variability in the thickness from the protective layer surface to a first information layer.

Next, the degree of variability that appears in the thickness from the protective layer surface to the first information layer in a four-layer optical information recording medium manufactured by layering intermediate layers, a protective layer, and so on having this ±2 μm thickness fluctuation range was examined. The thickness from the protective layer surface to the first information layer in an optical information recording medium in which a first intermediate layer, a second intermediate layer, a third intermediate layer, and a protective layer are layered was examined in 150 samples. The root-sum-square of the surface thickness variability in each intermediate layer were also examined for the same samples at this time. FIG. 6 illustrates those results. It can be seen that although the thickness of each intermediate layer has a range of ±2 μm, the thickness variability in a structure where four such layers are layered is not simply the sum of ±2 μm, or ±8 μm; rather, the variation is within ±4 μm, or the root-sum-square of each thickness variation. For this reason, if the desired thickness from the protective layer surface to the first information layer is 100 μm, that thickness ultimately has a fluctuation range of ±4 μm, and thus fluctuates within a range from 96 μm to 104 μm.

Figure 7:
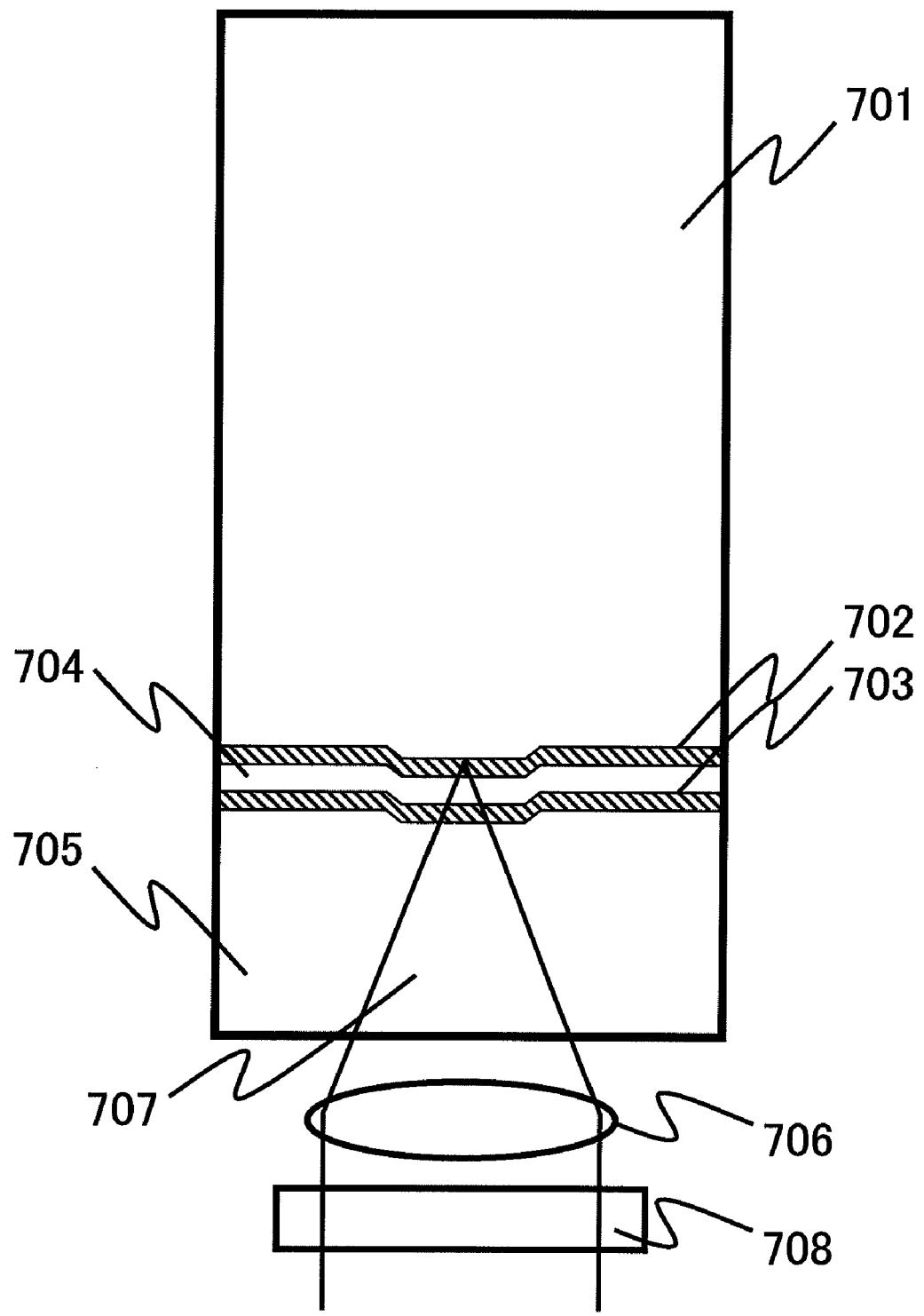
FIG. 7 is a diagram illustrating an exemplary structure of a dual-layer optical information recording medium.

Next, the relationship of the intermediate layer thickness and the quality of the recording/reproducing signal was examined for two information layers that sandwich that intermediate layer when the thickness of that intermediate layer is changed. Here, in order to create a simplified model for the thickness of the intermediate layer and the influence of inter-layer crosstalk between the information layers sandwiching that intermediate layer, a dual-layer optical information recording medium, such as that shown in FIG. 7, was used for evaluation. However, the same recording film as used for the second information layer and third information layer of the four-layer optical information recording medium was used for the two information layers here. "Interlayer crosstalk" as mentioned here refers to noise leaking into the signal to be read when focusing recording/reproducing light onto the information layer that is to be recorded to/reproduced. This is caused by more concentrated recording/reproducing light being irradiated onto other layers due to the diameter of the recording/reproducing light spot on other information layers dropping as a result of the thickness of the intermediate layer being reduced. Although the dual-layer optical information recording media were manufactured with several varying types of intermediate layer thicknesses, the thickness of the protective layer in all the media was 63 μm.

Figure 8:
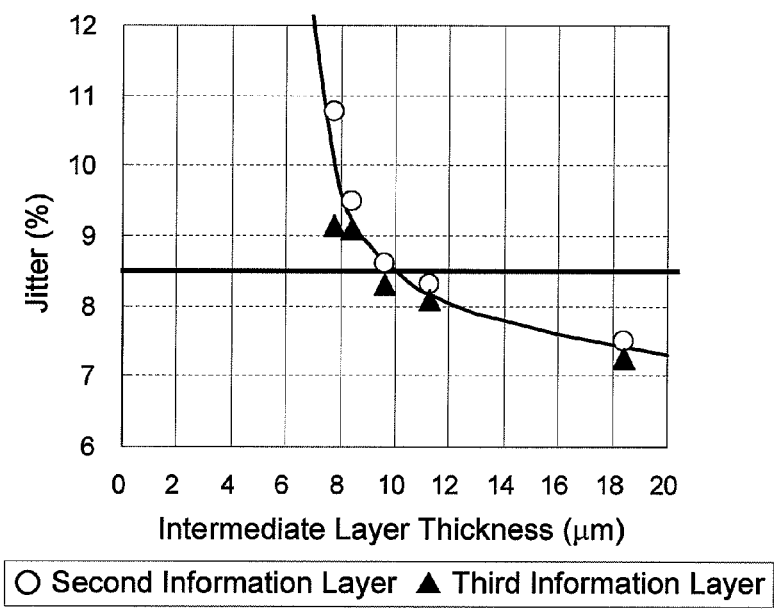
FIG. 8 is a diagram illustrating the thickness of an intermediate layer and the reproducing signal properties of a recorded/reproduced signal.

As an evaluation method, a signal was recorded to both information layers at the same radial position, and jitter values containing signal leakage from the other layer were examined. "Jitter value" refers to the amount of fluctuation or deviation from the desired temporal position of the recorded signal, and the lower the jitter value, the higher the reproducing quality of the signal. FIG. 8 illustrates the thickness of the intermediate layer and the reproducing signal properties of a signal recorded to/reproduced from each information layer. Note that the recording/reproducing of the signal was performed at a linear speed of 4.9 m/s, and the jitter was evaluated in a state boosted by a limit equalizer. A jitter value of 8.5% or less was used as a benchmark for determining the quality of the medium. If this jitter value can be obtained, error correction can be performed with almost no problems, and is thus a level that enables reproducing. As can be seen in FIG. 8, the thinner the intermediate layer is, the worse the jitter value becomes in both layers, due to the influence of interlayer crosstalk. The degradation of the jitter value becomes particularly apparent at thicknesses of less than 10 μm, and it is thus necessary for the intermediate layer to be at least 10 μm in order to meet the criteria for jitter value. Furthermore, based on this graph, the influence of interlayer crosstalk from an adjacent information layer are extremely small when the intermediate layer is 18 μm or thicker, and the influence on the jitter value is minor.

Next, the influence of interference caused by multisurface reflected light shall be evaluated. As shown in FIGS. 3(a) to 3(c), when the recording/reproducing light is focused upon the information layer to be read out, if some of the stray light reflected by another layer is reflected in multiple via one of the information layers, the protective layer surface, or the like, and then enters the photodetector in the optical head with the same optical path length and with the same beam diameter as the information light to be read out, those stray light components enter the photodetector having been reflected by multiple information layers. The stray light components therefore have a much smaller light amount relative to the information light to be read out, but also enter the photodetector with the same optical path length and with the same beam diameter, resulting in major influence exerted by interference. Thus a minute change in the thicknesses of the intermediate layer or protective layer causes a major fluctuation in the light amount, making stable signal detection difficult.

Figure 3:
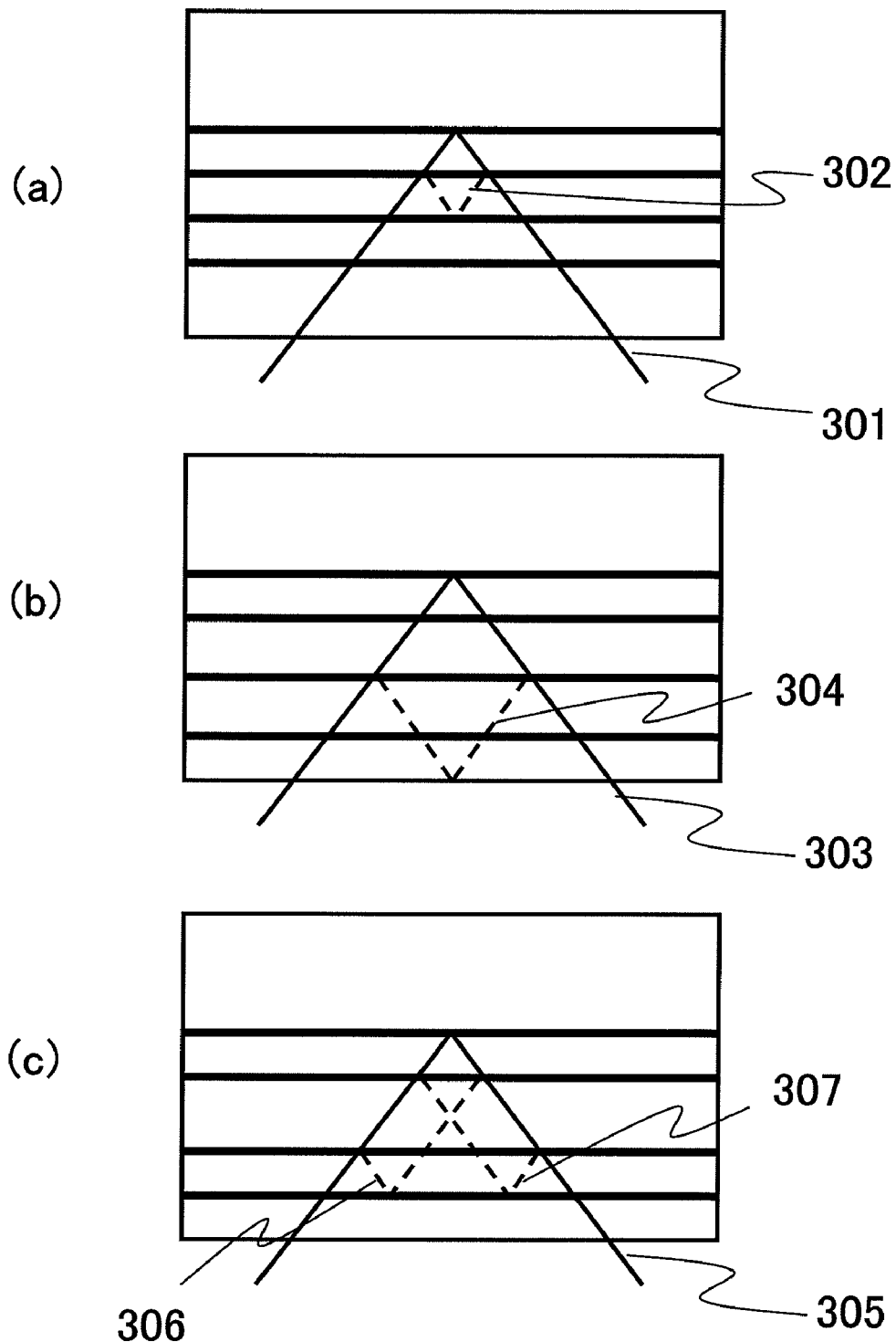
FIG. 3 is a diagram illustrating patterns in which back-focus issues arise.
Figure 9:
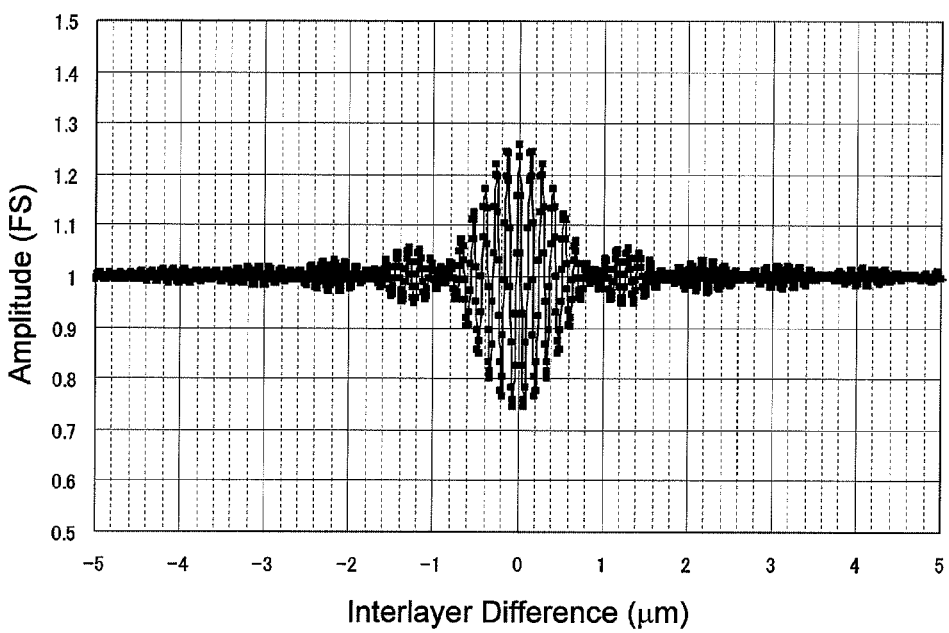
FIG. 9 is a diagram illustrating the reproducing signal amplitude relative to the difference in inter-layer thicknesses.

FIG. 9 illustrates the reproducing signal amplitude relative to the difference in inter-layer thicknesses when the light amount ratio of the information light to be read out to the stray light returning to the photodetector in a pattern as shown in FIG. 3 is 100:1. Note that "difference in inter-layer thicknesses" refers to the difference in the thicknesses of the first intermediate layer, the second intermediate layer, and the third intermediate layer. In FIG. 9, the horizontal axis expresses the difference in inter-layer thicknesses, and the vertical axis expresses the reproducing signal amplitude; the value has been normalized to a DC light amount found when only the information light to be read out is received by the photodetector. It can be seen in FIG. 9 that when the difference in inter-layer thicknesses drops below 1 μm, the reproducing signal amplitude fluctuates dramatically. Based on this, it is considered preferable to provide a difference of 1 μm or more for the thicknesses of the first intermediate layer, the second intermediate layer, and the third intermediate layer.

Next, the relationship between the thickness of the protective layer and the information signal recorded to or reproduced from the information layer shall be evaluated. There is a high likelihood that the surface of the protective layer will become soiled by dirt, dust, or fingerprints, or scratched. When such blemishes are present on the surface of the protective layer, the recording/reproducing light for recording to or reproducing from the information layers is blocked, the angle at which the recording/reproducing light enters changes, and so on, which significantly affects the quality of the signal for recording to or reproducing from the information layer. In addition, the thinner the protective layer is, the smaller the diameter of the beam of recording/reproducing light becomes on the protective layer surface when the recording/reproducing light is focused onto the information layer; therefore, if particles of dirt that are smaller than the diameter of the beam of recording/reproducing light on the protective layer surface are present, the size of the dust particles becomes larger relative to the beam diameter on the protective layer surface, even if the dust particles are the same size. This expands the area that blocks the recording/reproducing light, which is assumed to have major influence on the quality of the signal recorded to/reproduced from the information layer. Accordingly, a single-layer medium having recording film of the same structure as the fourth information layer of a four-layer optical information recording medium was evaluated; samples in which the thickness of the protective layer was changed from 100 μm to 30 μm were manufactured, blemishes were added to the protective layer surfaces of those media, and the error rate was examined to discover how much influence the blemishes had on the recording/reproducing signal in the information layer. Note that the recorded signal was a random-pattern signal modulated according to the 1-7PP modulation technique, with a reference clock frequency of 66 MHz and a minimum mark length of 149 nm, and the recording/reproducing linear speed was set to 4.9 m/s.

Figure 10:
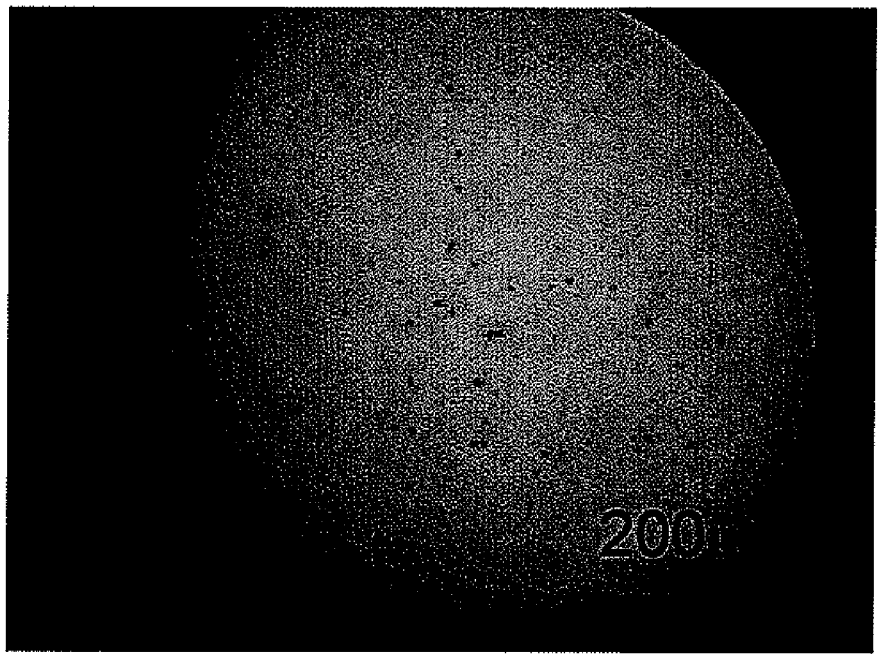
FIG. 10 illustrates the state of dust buildup on the protective layer surface as observed through a photon microscope.

The evaluation method shall be described next. Most dust particles in a general household environment are 20 μm or less in diameter. Therefore, in order to reproduce the dust particle buildup conditions of a general household environment, it is preferable to cause dust particles 20 μm or less in size to build up using a dust environment tester or the like. The amount of dust actually building up changes, of course, depending on environmental differences, the storage environment (whether the medium is stored in a case or not), how long the medium is stored, and so on, but when an optical information recording medium is actually inserted into a drive and rotated, almost all dust aside from that building up due to static electricity is shaken off. Taking this into consideration, a concentration of the occupancy of dust particles 20 μm or less in diameter on the protective layer surface (called "dust occupancy" here) of approximately 1% is said to be acceptable. Therefore, in the present first embodiment, dust of a dust occupancy of approximately 1% is caused to build up, using a dust environment tester, on the protective layer surfaces of samples in which the thicknesses of the protective layers have been changed, and the degree to which the error rate worsened when that medium was recorded to/reproduced was evaluated. The JIS test powder I, class 10 (fly ash, ultrafine) was used as the powder caused to build up. This powder has a particle diameter distribution in which 2 μm-sized dust is 82±5%, 4 μm-sized dust is 60±3%, 8 μm-sized dust is 22±2%, and 16 μm-sized dust is 3±3%, and is considered an extremely favorable powder for evaluating the influence of an environment with dust particles of 20 μm or less. An environment with a constant dust concentration was created using a dust environment tester (a Shibata AP-355), and a test optical information recording medium was left within the tester for a set amount of time, allowing dust to build up thereon. FIG. 10 illustrates the state of dust buildup on the protective layer surface as observed through a photon microscope. The buildup of dust resulted in a dust occupancy of approximately 1.3%.

The error rate (SER: Symbol Error Rate) was then evaluated using this sample. As a benchmark for an acceptable SER, an error rate of less than $4.2 \times 10^{-3}$ was considered to be non-problematic. This error rate value is a level at which there is the possibility that information cannot be read from one out of 1,000,000 media, and thus it can be said that there are no problems with the recording/reproducing properties of the optical information recording medium if the error rate is below this value. Furthermore, aside from the recording conditions at which the recording/reproducing signal quality is optimal when recording a signal, the recording stress state or reproducing stress state that actually occurs was given the same SER evaluation, and the acceptability thereof was determined. The recording stress state used here was determined by estimating the defocus amount of the recording/reproducing light, the influence of tilt that can occur in the disk, and the amount of spherical aberration that can occur, as well as setting errors in the recording power, errors in recording power learning for optimizing the recording power, recording power errors caused by temperature changes, and so on. Here, as a recording stress state, the power was set to 8.8% lower than the optimal recording power. Meanwhile, the reproducing stress state was determined by estimating the manufacturing variability in the optical head that performs readout, a defocus amount, track skew caused by disk tilt, and the like. Here, the power was set to 29% lower than the normal reproducing power.

Figure 11:
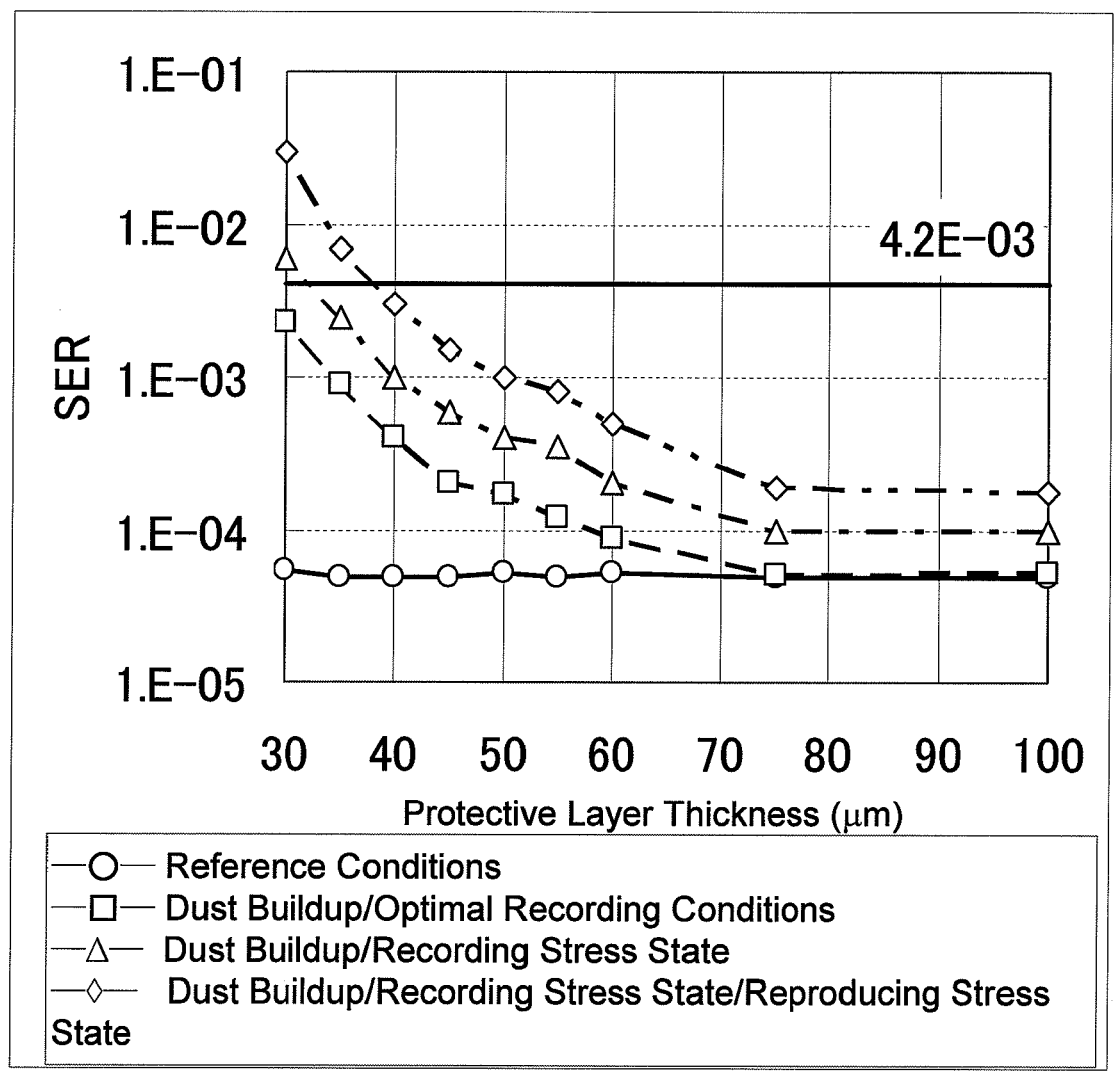
FIG. 11 is a diagram illustrating the relationship between the thickness of the protective layer and the SER.

FIG. 11 illustrates SER value evaluations for an optical information recording media whose protective layers vary from 100 μm to 30 μm. Here, the SER value when recording under the optimal recording conditions, the SER value when recording under recording stress conditions, and furthermore the SER value when the signal recorded under the recording stress conditions was reproduced under reproducing stress conditions, were evaluated using a sample in which dust was allowed to build up on the protective layer surface in the manner shown in FIG. 10. An SER obtained when a sample in which no dust builds up on the protective layer surface has been recorded to under optimal recording conditions and reproduced at a normal reproducing power was used as a reference value. Because the results show that the SER value does not exceed $4.2 \times 10^{-3}$ under the dust buildup state, recording stress state, and reproducing stress state, it can be said that a protective layer thickness of 40 μm or more is acceptable.

Next, the degree of influence of back-focus issues was evaluated. With a four-layer optical information recording medium, a total of five reflective surfaces, or the information layers from the first information layer to the fourth information layer and the surface of the protective layer, are present. When the recording/reproducing light is focused onto one of the information layers, some of the stray light reflected from the other reflective layers undergoes repeated multisurface reflection, and returns to the photodetector provided in the optical head. The stray light that returns to the photodetector always returns to the photodetector having been reflected by one of the boundary surfaces an odd number of times. Accordingly, a pattern in which the stray light returns to the photodetector after three reflections and a pattern in which the stray light returns to the photodetector after five reflections were considered, and the degree of influence thereof was evaluated.

The reflectances and transmissibilities of the information layers in the four-layer optical information recording medium according to the present first embodiment are shown in Table 1.

TABLE 1

|  | Reflectance | Transmissibility |
| --- | --- | --- |
| First Information Layer | 32.0% | 0.0% |
| Second Information Layer | 16.0% | 66.3% |
| Third Information Layer | 7.5% | 74.6% |
| Fourth Information Layer | 5.1% | 77.0% |
| Protective Layer Surface | 3.0% | 97.0% |

The reflectances and transmissibilities of the information layers are set so that the reflectances of the information layers are approximately identical when those information layers are reproduced. For this reason, the nearer to the first information layer from the protective layer, the higher and lower, respectively, the reflectances and transmissibilities of the information layers are. When this information layer composition is used, the reflectances of the information layers during recording/reproducing balances out at around 4-5%.

Figure 12:
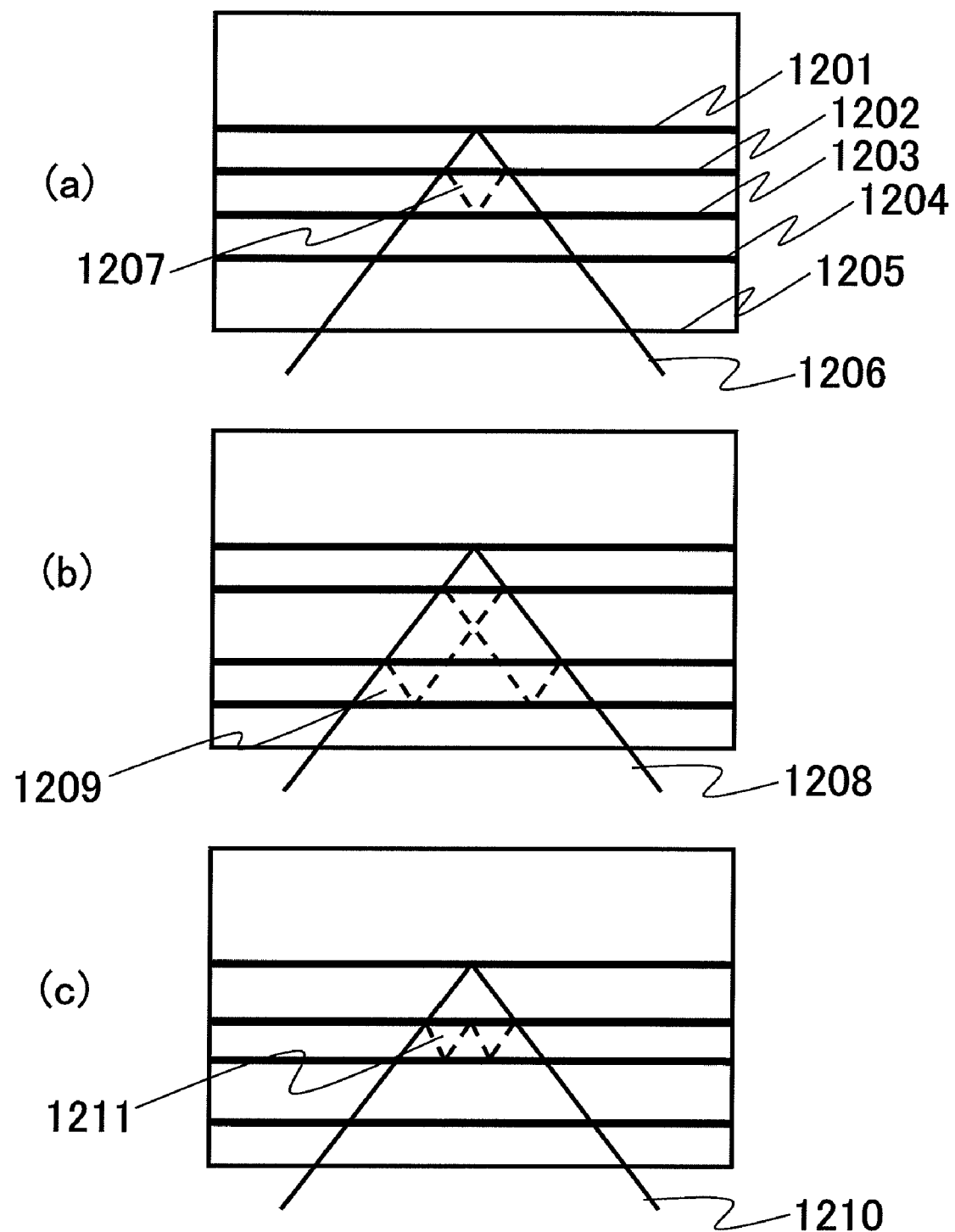
FIG. 12 is a diagram illustrating exemplary back-focus issues with three reflections and five reflections.
Figure 13:
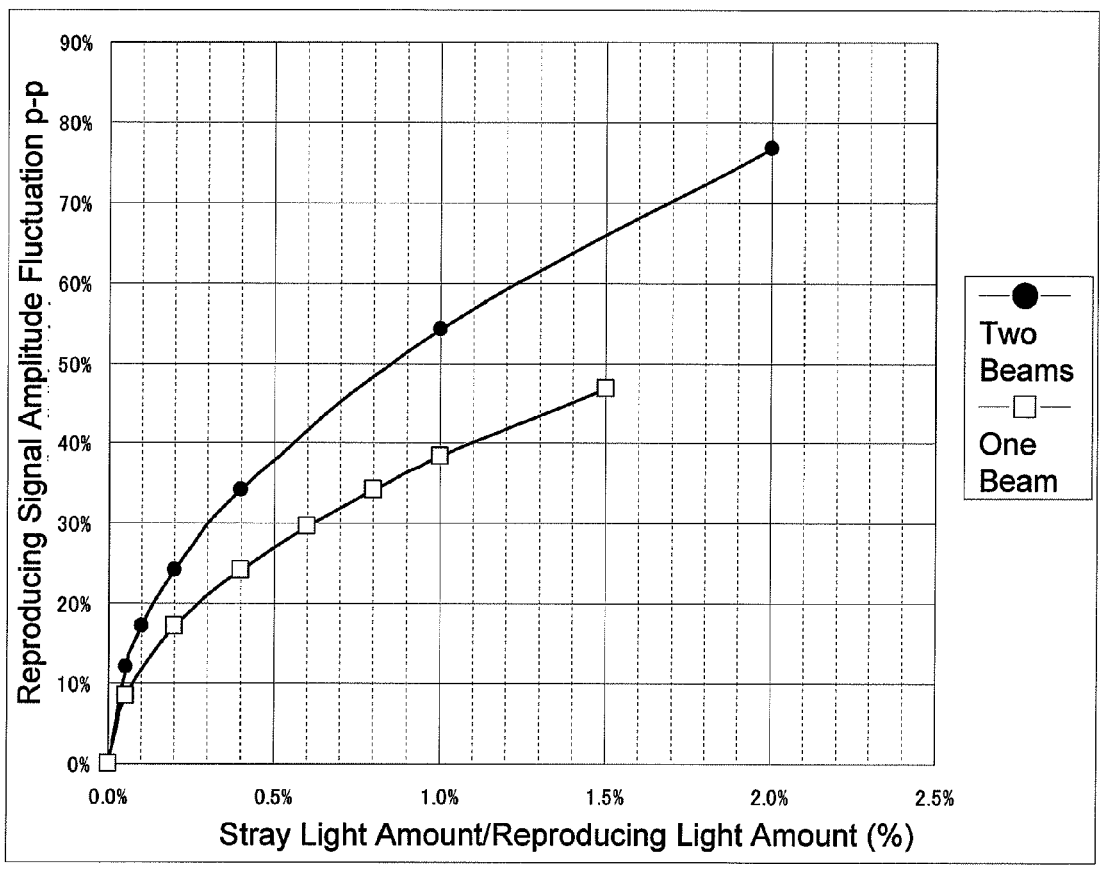
FIG. 13 is a diagram illustrating the relationship between the ratio of the amount of stray light to the amount of reproducing light and the fluctuation range of the reproducing signal amplitude.

FIG. 12 illustrates an example of back-focus issues that may arise, including a back-focus issue with three reflections and a back-focus issue with five reflections. Because the reflectances of the information layers are higher the closer to the first information layer, the amount of stray light that returns to the photodetector is greater when multisurface reflection occurs in one of the information layers closer to the first information layer than to the protective layer surface. For example, the pattern shown in FIG. 12(a) illustrates stray light that returns after being reflected three times, by the second information layer, the third information layer, and the second information layer again, when the recording/reproducing light is focused on the first information layer. In this case, the stray light is undergoes multisurface reflection between the second information layer and the third information layer, which have high reflectances, and thus among the three reflections that can occur, this pattern has the highest amount of stray light relative to the amount of light reflected by the first information layer onto which the recording/reproducing light is focused. In this pattern, the amount of stray light is approximately 1.4% of the amount of reproducing light on the first information layer. FIG. 13 illustrates the relationship between the ratio of the amount of stray light to the amount of reproducing light and the fluctuation range of the reproducing signal amplitude. In the pattern shown in FIG. 12(a), the amount of stray light is approximately 1.4% of the amount of reproducing light, and thus the reproducing signal amplitude fluctuates by approximately 45% as a result.

Meanwhile, the pattern shown in FIG. 12(b) illustrates stray light that returns after passing through the second information layer, the fourth information layer, and the third information layer, when the recording/reproducing light is focused on the first information layer. At the same time, stray light that returns to the photodetector after being reflected by the third information layer, the fourth information layer, and the second information layer also occurs in this pattern; because two incidences of stray light return to the photodetector, the influence thereof is great. In the present first embodiment, the amount of stray light relative to the amount of reproducing signal light is approximately 0.87%. In addition to a case where a single beam of stray light occurs, as mentioned earlier with reference to FIG. 12(a), FIG. 13 also shows correlation data for a case where two beams of stray light occur, as shown in FIG. 12(b). In a pattern where two beams of light return to the photodetector, as shown in FIG. 12(b), the reproducing signal amplitude fluctuates by approximately 50% when the amount of stray light is taken as approximately 0.87% of the amount of reproducing signal light.

Next, the influence of stray light reflected five times shall be evaluated. Because multilayer reflection occurring at an information layer toward the first information layer side is multilayer reflection by an information layer with a higher reflectance, a greater amount of stray light returns to the photodetector. For this reason, the pattern of five reflections shown in FIG. 12(c), in which the light returns to the photodetector having been reflected by the second information layer, the third information layer, the second information layer, the third information layer, and the second information layer when the recording/reproducing light is focused on the first information layer, is considered to be the pattern with the greatest amount of stray light, compared to the other patterns in which the stray light returns after five reflections. In this case, the amount of stray light is approximately 0.02% of the amount of reproducing light, and thus estimating the fluctuation of the reproducing signal amplitude based on FIG. 13 shows a fluctuation range of approximately 2-3%. Fluctuation of this degree does not exert significant influence on the quality of the recording/reproducing signal. Therefore, stray light that returns to the photodetector after being reflected five times can be ignored. Based on this, it is acceptable to consider only stray light that returns to the photodetector having been reflected three or fewer times by one of the information layers or the protective layer surface to be detrimental to the quality of the recording/reproducing signal due to the influence of back-focus issues.

Figure 14:
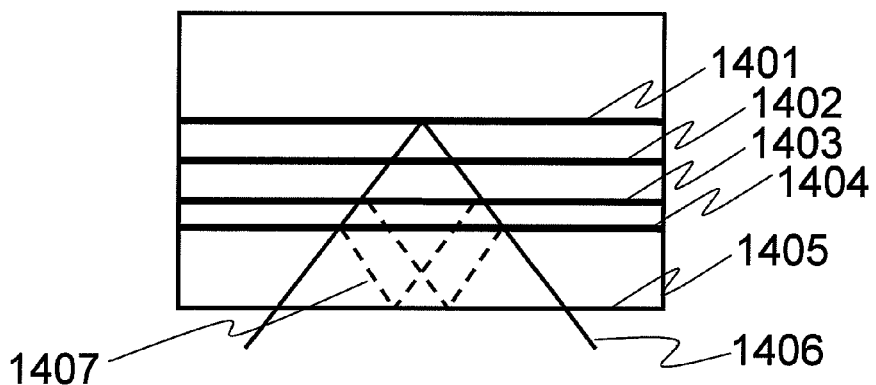
FIG. 14 is a diagram illustrating an exemplary pattern in which back-focus issues arise.
Figure 15:
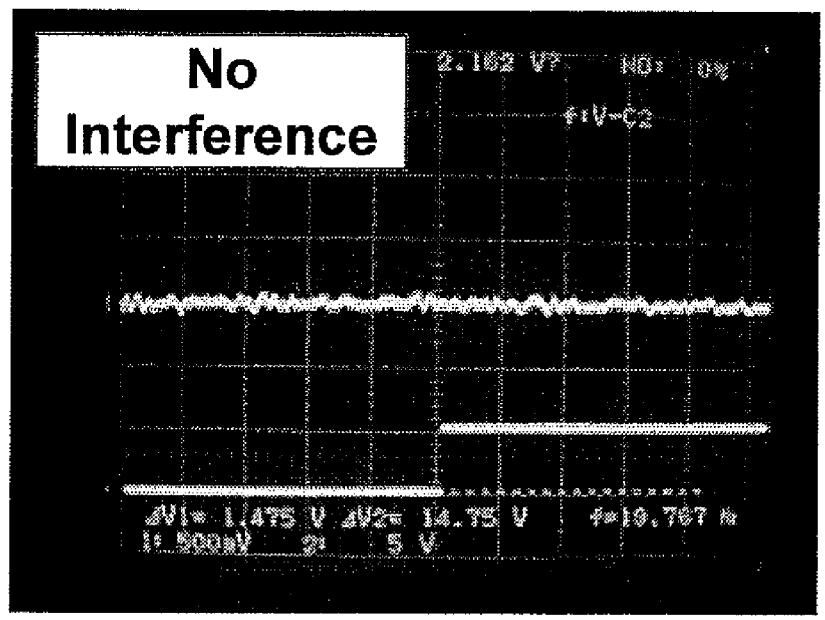
FIG. 15 is a diagram illustrating the state of reproducing signal amplitude fluctuation when interference between stray light and information light has occurred.
Figure 15:
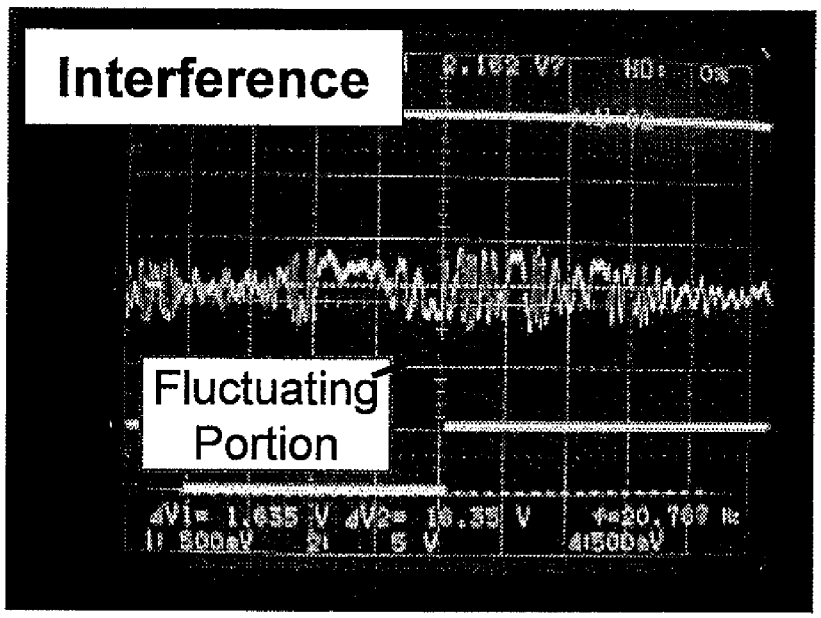

FIG. 15 illustrates the fluctuation of the reproducing signal amplitude in the case where interference occurs between stray light that returns to the photodetector having been reflected three times and the information light. FIG. 15(b) illustrates the fluctuation of the reproducing signal amplitude caused by the influence of stray light entering the photodetector with the same optical path length and the same beam diameter as the information light from the first information layer that is to be read out, with that stray light having been reflected three times, by the fourth information layer, the protective layer surface, and the third information layer, as shown in FIG. 14. FIG. 15(a), meanwhile, shows a reproducing signal waveform occurring when the protective layer of the optical information recording medium shown in FIG. 14 is manufactured with a thickness increased by approximately 3 μm. The influence of interference has been eliminated by shifting the optical path length of the same thrice-reflected stray light from the optical path length of the information light from the first information layer.

Figure 16:
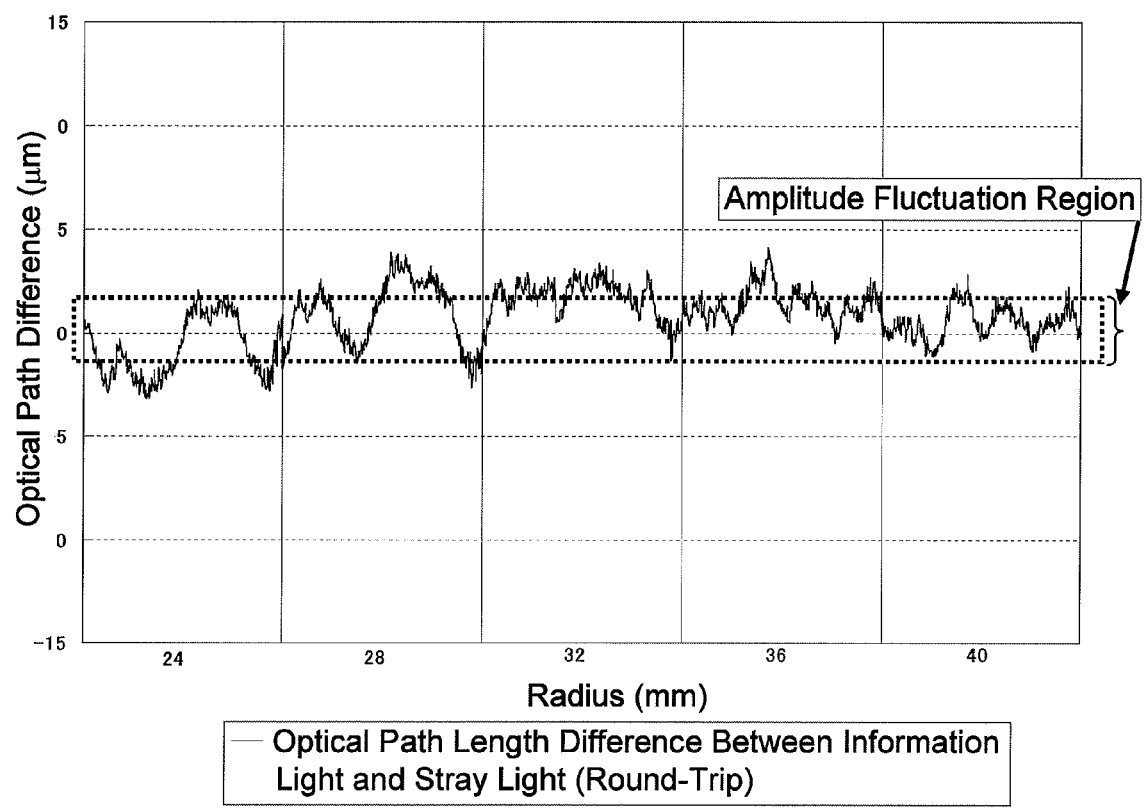
FIG. 16 is a diagram comparing the optical path length of information light with the optical path length of stray light.

Here, it was examined how far the optical path length needed to be shifted from the optical path length of the information light to be read out in order to eliminate the influence of interference. It can be seen, from looking at the reproducing signal waveform in FIG. 15(b), that there are regions of large and small amplitude fluctuations. The optical path length of the information light was compared with the optical path length of the stray light in these respective regions. The comparison results are shown in FIG. 16. The horizontal axis expresses the radius of the optical information recording medium, whereas the vertical axis expresses the difference between the optical path length of the information light (the round-trip optical path length, from when the recording/reproducing light enters from the protective layer surface and exits from the protective layer surface) and the optical path length of stray light resulting from three reflections as shown in FIG. 14. In other words, the portion in the vertical axis where the optical path length difference between the information light and the stray light is 0 represents conditions in which the information light and the stray light return to the photodetector with the same optical path length and the same beam diameter. However, it can be seen, in the data shown in FIG. 16, that large fluctuations occur in the signal amplitude not only in regions where the optical path length difference is 0, but also in regions where the optical path length difference is 0±2 μm. Based on this result, it was concluded that a optical path length difference of ±2 μm or more is preferable.

Next, the conditions required to set the optical path length difference between the information light and the stray light to ±2 μm or more shall be described.

When focusing recording/reproducing light on an information layer even further than the fourth information layer (on the side opposite to the light entry side) in an optical information recording medium that has four information layers, stray light problems can occur in the following two patterns. Note that in the following descriptions, the information layer to/from which recording/reproducing is performed shall be called the "recording/reproducing information layer".

The first pattern of stray light problem assumes stray light reflected three times, from an information layer B on the light entry side of the recording/reproducing information layer A→an information layer C further on the light entry side or the protective layer surface→information layer B, in which case the round-trip optical path length difference between the information light that returns to the optical head from the recording/reproducing information layer A and the aforementioned stray light is less than 2 μm; therefore, interference can occur between the information light and the stray light.

This first pattern of stray light problem is solved by setting the round-trip optical path length difference between the thickness between the recording/reproducing information layer A and the information layer B and the thickness between the information layer B and the information layer C/protective layer surface to a value that exceeds 1 μm. Note that the "thickness" mentioned here refers to the thickness measured by the aforementioned thickness gauge.

To be more specific, when the information layer to be recorded to/reproduced from is the first information layer 102, it is necessary for the following six patterns to hold true in order to prevent interference between the information light and the stray light.

$$|t1-t2|>1 \text{ μm} \tag{1}$$

(This makes it possible to prevent interference with stray light reflected by the second information layer 103→the third information layer 104→the second information layer 103, in that order.)

$$|t1-(t2+t3)|>1 \text{ μm} \tag{2}$$

(This makes it possible to prevent interference with stray light reflected by the second information layer 103→the fourth information layer 105→the second information layer 103, in that order.)

$$|t1-(t2+t3+tc)|>1 \text{ μm} \tag{3}$$

(This makes it possible to prevent interference with stray light reflected by the second information layer 103→the protective layer surface 109a→the second information layer 103, in that order.)

$$|(t1+t2)-t3|>1 \text{ μm} \tag{4}$$

(This makes it possible to prevent interference with stray light reflected by the third information layer 104→the fourth information layer 105→the third information layer 104, in that order.)

$$|(t1+t2)-(t3+tc)|>1 \text{ μm} \tag{5}$$

(This makes it possible to prevent interference with stray light reflected by the third information layer 104→the protective layer surface 109a→the third information layer 104, in that order.)

$$|(t1+t2+t3)-tc|>1 \text{ μm} \tag{6}$$

(This makes it possible to prevent interference with stray light reflected by the fourth information layer 105→the protective layer surface 109a→the fourth information layer 105, in that order.)

When the information layer to be recorded to/reproduced from is the second information layer 103, it is necessary for the following three patterns to hold true in order to prevent interference between the information light and the stray light.

$$|t2-t3|>1 \text{ μm} \tag{7}$$

(This makes it possible to prevent interference with stray light reflected by the third information layer 104→the fourth information layer 105→the third information layer 104, in that order.)

$$|t2-(t3+tc)|>1 \text{ μm} \tag{8}$$

(This makes it possible to prevent interference with stray light reflected by the third information layer 104→the protective layer surface 109a→the third information layer 104, in that order.)

$$|(t2+t3)-tc|>1 \text{ μm} \tag{9}$$

(This makes it possible to prevent interference with stray light reflected by the fourth information layer 105→the protective layer surface 109a→the fourth information layer 105, in that order.)

When the information layer to be recorded to/reproduced from is the third information layer 104, it is necessary for the following pattern to hold true in order to prevent interference between the information light and the stray light.

$$|t3-tc|>1 \text{ μm} \tag{10}$$

(This makes it possible to prevent interference with stray light reflected by the fourth information layer 105→the protective layer surface 109a→the fourth information layer 105, in that order.)

The second pattern of stray light problem assumes stray light reflected three times, from an information layer b on the light entry side of the recording/reproducing information layer a→an information layer c further on the light entry side or the protective layer surface→an information layer d closer to the light entry side than the information layer b and on the side opposite to the light entry side of the information layer c or the protective layer surface, and is solved by reducing the round-trip optical path length difference between the information light returning to the optical head from the recording/reproducing information layer a and the aforementioned stray light to less than 2 μm. Note that stray light reflected three times, from the information layer d→the information layer c or the protective layer surface→information layer b, also occurs in this second pattern, and thus interference is caused by the two light beams.

This second pattern of stray light problem is solved by setting the thickness between the information layer a and the information b and the thickness between the information layer c and the information layer d/protective layer surface to have a difference that exceeds 1 μm.

To be more specific, when the information layer to be recorded to/reproduced from is the first information layer 102, it is necessary for the following four patterns to hold true in order to prevent interference between the information light and the stray light.

$$|t1-t3|>1 \text{ μm} \tag{11}$$

(This makes it possible to prevent interference with stray light reflected by the second information layer 103→the fourth information layer 105→the third information layer 104, in that order, and at the same time prevent interference with stray light reflected by the third information layer 104→the fourth information layer 105→the second information layer 103, in that order.)

$$|t1-(t3+tc)|>1 \text{ μm} \tag{12}$$

(This makes it possible to prevent interference with stray light reflected by the second information layer 103→the protective layer surface 109a→the third information layer 104, in that order, and at the same time prevent interference with stray light reflected by the third information layer 104→the protective layer surface 109*a*→the second information layer 103, in that order.)

$$|t1-tc|>1 \text{ μm} \quad (13)$$

(This makes it possible to prevent interference with stray light reflected by the second information layer 103→the protective layer surface 109*a*→the fourth information layer 105, in that order, and at the same time prevent interference with stray light reflected by the fourth information layer 105→the protective layer surface 109*a*→the second information layer 103, in that order.)

$$|(t1+t2)-tc|>1 \text{ μm} \quad (14)$$

(This makes it possible to prevent interference with stray light reflected by the third information layer 104→the protective layer surface 109*a*→the fourth information layer 105, in that order, and at the same time prevent interference with stray light reflected by the fourth information layer 105→the protective layer surface 109*a*→the third information layer 104, in that order.)

When the information layer to be recorded to/reproduced from is the second information layer 103, it is necessary for the following pattern to hold true in order to prevent interference between the information light and the stray light.

$$|t2-tc|>1 \text{ μm} \quad (15)$$

(This makes it possible to prevent interference with stray light reflected by the third information layer 104→the protective layer surface 109*a*→the fourth information layer 105, in that order, and at the same time prevent interference with stray light reflected by the fourth information layer 105→the protective layer surface 109*a*→the third information layer 104, in that order.)

Next, a specific disk composition (the thicknesses of each film) shall be examined. It is possible for the thicknesses of the layers to exhibit a variability in the range of ±2 μm. Therefore, in addition to taking into consideration a thickness variability of ±2 μm for cases in which the thickness from the protective layer surface to the first information layer was 100, 101, and 102 mm (±4 μm), respectively, the influence of back-focus was examined as more specific case.

Thickness compositions that meet the conditions evaluated thus far and do not experience back-focus issues of up to three reflections are indicated in Table 2. Note that the conditions evaluated thus far are a thickness variability of ±2 μm in the intermediate layers and protective layer, a protective layer thickness of 40 μm or more, a minimum intermediate layer thickness of 10 μm or more, an interlayer thickness difference of 1.0 μm or more, a thickness between the protective layer surface and the first information layer of 100±4 μm, and an optical path length difference between the information light and the stray light of ±2 μm or more.

The following experimental examples illustrate the range of the upper limit of the thickness to the lower limit of the thickness, taking into consideration the thickness variability of ±2 μm in each layer.

TABLE 2

| | Thickness Composition (μm) | | | | Jitter (%) | | | | |
| --- | --- | --- | --- | --- | --- | --- | --- | --- | --- |
| | 1st | 2nd | 3rd | | | | | | |
| No. | Intermediate Layer t1 (μm) | Intermediate Layer t2 (μm) | Intermediate Layer t3 (μm) | Protective Layer tc (μm) | 1st Information Layer | 2nd Information Layer | 3rd Information Layer | 4th Information Layer | Determination |
| 1 | 22-26 | 11-15 | 17-21 | 42-46 | 6.1 | 8.2 | 8.1 | 7.0 | ○ |
| 2 | 17-21 | 11-15 | 22-26 | 42-46 | 6.0 | 8.3 | 8.0 | 7.0 | ○ |
| 3 | 22-26 | 10-14 | 17-21 | 43-47 | 6.1 | 8.4 | 8.3 | 7.1 | ○ |
| 4 | 17-21 | 10-14 | 22-26 | 43-47 | 6.0 | 8.4 | 8.3 | 7.0 | ○ |
| 5 | 22-26 | 11-15 | 16-20 | 43-47 | 6.0 | 8.2 | 8.1 | 7.1 | ○ |
| 6 | 16-20 | 11-15 | 22-26 | 43-47 | 6.1 | 8.2 | 8.0 | 7.1 | ○ |
| 7 | 16-20 | 22-26 | 11-15 | 43-47 | 8.8 | 8.0 | 7.9 | 7.3 | x |
| 8 | 11-15 | 16-20 | 22-26 | 43-47 | 6.3 | 9.8 | 7.9 | 7.1 | x |

In Table 2, No. 1-No. 6 have thickness compositions in which back-focus issues of up to three reflections do not occur; No. 7 and No. 8, however, have thickness compositions in which back-focus issues of up to three reflections occur. Looking at the thickness compositions of No. 1-No. 6 in Table 2, when the thickness from the protective layer surface to the first information layer is 100 μm, and considering that the second intermediate layer is the thinnest and a thickness variability of ±2 μm is present, the minimum intermediate layer thickness is 10 μm, and the maximum intermediate layer thickness is 26 μm. Furthermore, the minimum protective layer thickness is 42 μm, and the maximum protective layer thickness is 47 μm.

The recording/reproducing properties of optical information recording media having these eight thickness compositions were investigated. Limit-equalized jitter was evaluated as the indicator of these properties. Recording/reproducing was performed at a recording/reproducing linear speed of 4.9 m/s using an optical head having a wavelength of 405 nm and an objective lens with an NA of 0.85. There are no problems with performance if the respective jitter values are under 8.5%. When performing the evaluations, a signal is recorded onto all information layers within the same radius, and thus the results shown here indicated states having signal crosstalk from other layers. In the patterns from No. 1 to No. 6, the thicknesses of the intermediate layers and the thickness of the protective layer all have the desired thickness variability within ±2 μm in that surface, and reproducing signal amplitude fluctuations due to back-focus issues do not occur in any of the regions within the surface of the medium; moreover, jitter of less than 8.5% was confirmed in all information layers.

With the thickness composition in No. 7, back-focus issues with three reflections, from the third information layer, the protective layer surface, and the fourth information layer, occurred when recording to/reproducing from the first information layer, causing signification fluctuations in the reproducing signal amplitude. Furthermore, the jitter value in the first information layer at that time exceeded 8.5%. The reason for this is that in the above pattern (14), the value of |(t1+t2)−tc| is less than 1 μm, and as a result, the optical path length difference between the information light and the stray light is sometimes less than 2 μm.

Meanwhile, with the thickness composition in No. 8, back-focus issues with three reflections, from the fourth information layer, the protective layer surface, and the fourth information layer, occurred when recording to/reproducing from the second information layer. The jitter value greatly exceeded 8.5%. The reason for this is that in the above pattern (9), the value of |(t2+t3)−tc| is less than 1 μm, and as a result, the optical path length difference between the information light and the stray light is sometimes less than 2 μm.

Although only the thickness compositions indicated in Table 2 have been described here, the compositions are not limited to those patterns as long as the stated conditions, where the thickness variability of the intermediate layers and protective layer is ±2 μm, the thickness of the protective layer is 40 μm or more, the minimum intermediate layer thickness is 10 μm or more, the interlayer thickness difference is 1.0 μm or more, the thickness from the protective layer surface to the first information layer is 100±4 μm, and the optical path length difference between the information light and the stray light is ±2 μm taking into consideration stray light that returns to the optical head after up to three reflections, are met.

Second Embodiment

In the present second embodiment, the thickness composition and recording/reproducing signal properties were evaluated for a four-layer optical information recording medium in the case where the thickness from the protective layer surface to the first information layer is 101±4 μm. The necessary conditions are the same as described in the first embodiment; namely, a thickness variability in the intermediate layers and protective layers of ±2 μm, a protective layer thickness of 40 μm or more, a minimum intermediate layer thickness of 10 μm, an interlayer thickness difference of 1.0 μm or more, and an optical path length difference between the information light and the stray light of ±2 μm or more.

Aside from the thickness from the protective layer surface to the first information layer being 101 μm, the composition is exactly the same as in the first embodiment.

The reason the thickness from the protective layer surface to the first information layer was increased to 101 μm in the present second embodiment is that current dual-layer Blu-ray disks allow a variability in the thickness to the first information layer of 100 μm±5 μm. The thickness from the protective layer surface to the first information layer is set to 101±4 μm to create a range that is compliant with current dual-layer drives.

The thickness compositions and recording/reproducing properties of the four-layer optical information recording media of the present second embodiment are shown in Table 3.

TABLE 3

| | Thickness Composition (μm) | | | | Jitter (%) | | | | |
|---|---|---|---|---|---|---|---|---|---|
| | 1st | 2nd | 3rd | | | | | | |
| No. | Intermediate Layer t1 (μm) | Intermediate Layer t2 (μm) | Intermediate Layer t3 (μm) | Protective Layer tc (μm) | 1st Information Layer | 2nd Information Layer | 3rd Information Layer | 4th Information Layer | Determination |
| 1 | 23-27 | 10-14 | 18-22 | 42-46 | 6.0 | 8.4 | 8.3 | 7.0 | ○ |
| 2 | 18-22 | 10-14 | 23-27 | 42-46 | 6.1 | 8.4 | 8.3 | 7.0 | ○ |
| 3 | 22-26 | 11-15 | 17-21 | 43-47 | 6.0 | 8.2 | 8.1 | 7.1 | ○ |
| 4 | 17-21 | 11-15 | 22-26 | 43-47 | 6.0 | 8.2 | 8.2 | 7.0 | ○ |
| 5 | 22-26 | 10-14 | 17-21 | 44-48 | 6.0 | 8.4 | 8.3 | 7.0 | ○ |
| 6 | 17-21 | 10-14 | 22-26 | 44-48 | 6.1 | 8.4 | 8.3 | 7.0 | ○ |
| 7 | 22-26 | 11-15 | 16-20 | 44-48 | 6.0 | 8.1 | 8.1 | 7.1 | ○ |
| 8 | 16-20 | 11-15 | 22-26 | 44-48 | 6.1 | 8.1 | 8.2 | 7.0 | ○ |
| 9 | 11-15 | 22-26 | 17-21 | 43-47 | 6.2 | 10.5 | 8.0 | 7.0 | × |

In Table 3, the patterns in No. 1-No. 8 have thickness compositions in which back-focus issues of up to three reflections do not occur, whereas No. 9 has a thickness composition in which back-focus issues of three reflections occur.

Looking at the thickness compositions of No. 1-No. 8 in Table 3, when the thickness from the protective layer surface to the first information layer is 101±4 μm, and considering that the second intermediate layer is the thinnest and a thickness variability of ±2 μm is present, the minimum intermediate layer thickness is 10 μm, and the maximum intermediate layer thickness is 27 μm. Furthermore, the minimum protective layer thickness is 42 μm, and the maximum protective layer thickness is 48 μm.

Favorable results were obtained in No. 1 to No. 8, where the thicknesses of the intermediate layers and the thickness of the protective layer all have the desired thickness variability within ±2 μm in that surface, reproducing signal amplitude fluctuations due to back-focus issues do not occur in any of the regions within the surface of the medium, and the target jitter of less than 8.5% was met in all information layers.

However, with No. 9, back-focus issues with three reflections, from the fourth information layer, the protective layer surface, and the fourth information layer, occurred when recording to/reproducing from the second information layer. As a result, the jitter value degraded considerably, exceeding 8.5%. The reason for this is that in the above pattern (9), the value of |(t2+t3)−tc| is less than 1 μm, and as a result, the optical path length difference between the information light and the stray light is sometimes less than 2 μm.

Third Embodiment

In the present third embodiment, the thickness composition and recording/reproducing signal properties were evaluated for a four-layer optical information recording medium in the case where the thickness from the protective layer surface to the first information layer is 102±4 μm. The necessary conditions are the same as described in the first embodiment; namely, a thickness variability in the intermediate layers and protective layers of ±2 μm, a protective layer thickness of 40

μm or more, a minimum intermediate layer thickness of 10 μm, an interlayer thickness difference of 1.0 μm or more, and an optical path length difference between the information light and the stray light of ±2 μm or more.

Aside from the thickness from the protective layer surface to the first information layer being 102 μm, the composition is exactly the same as in the first embodiment.

The reason the thickness from the protective layer surface to the first information layer was increased to 102 μm in the present third embodiment is that doing so makes it more possible to design the thicknesses of the intermediate layer to be wider. As illustrated in FIG. 8, the jitter value degrades dramatically due to the influence of interlayer crosstalk when the thickness of the intermediate layers is reduced. Designing the thickness from the protective layer surface to the first information layer to be wider makes it possible to increase the minimum intermediate layer thickness.

The thickness compositions and recording/reproducing properties of the four-layer optical information recording media of the present third embodiment are shown in Table 4.

surface, and the fourth information layer, occurred when recording to/reproducing from the first information layer. As a result, the jitter value degraded considerably, exceeding 8.5%. The reason for this is that in the above pattern (14), the value of $|(t1+t2)-tc|$ is less than 1 μm, and as a result, the optical path length difference between the information light and the stray light is sometimes less than 2 μm.

Fourth Embodiment

Figure 18:
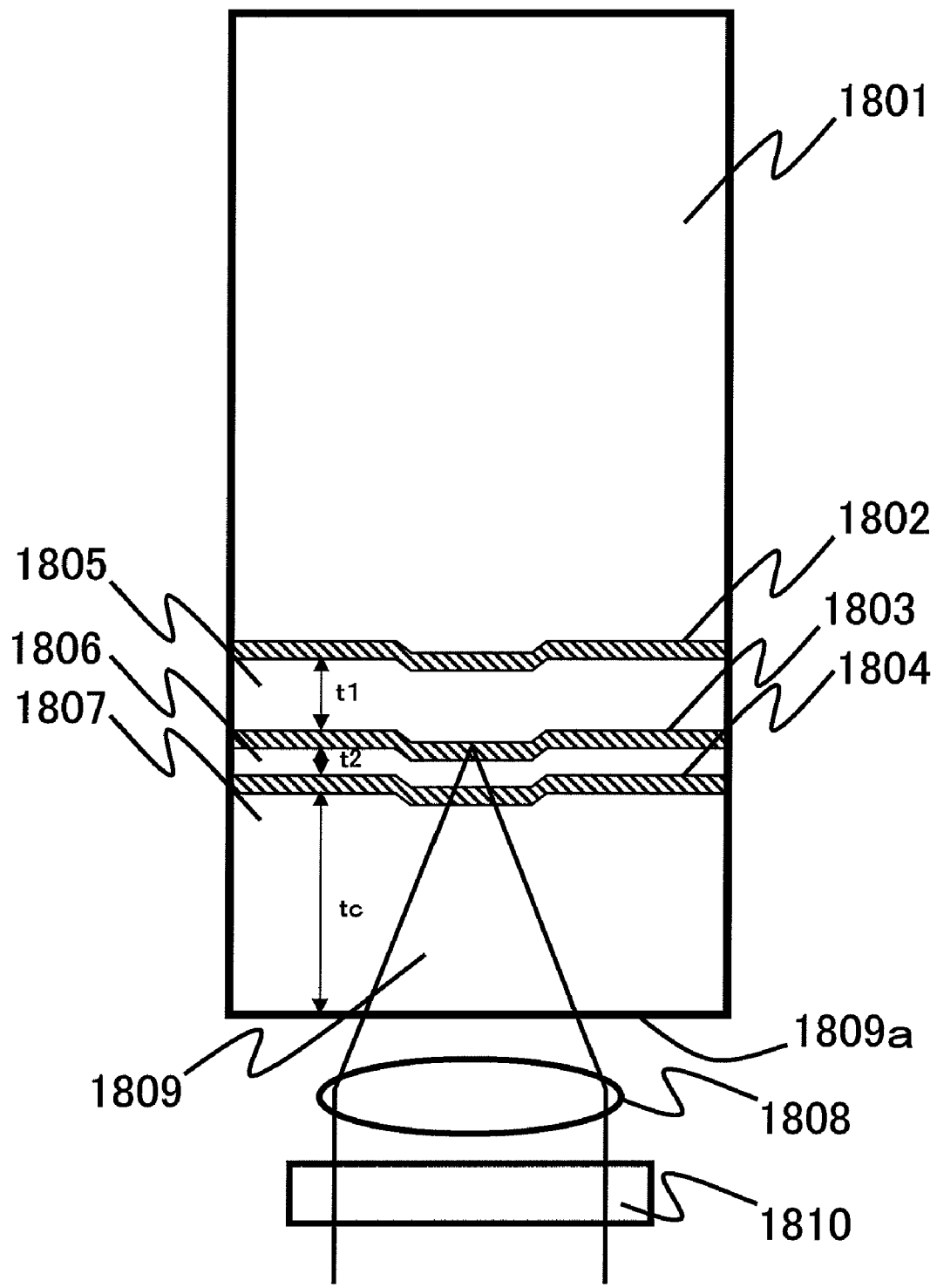
FIG. 18 is a diagram illustrating an exemplary structure of a multilayer optical information recording medium according to a fourth embodiment of the present invention.

In the present fourth embodiment, a three-layer optical information recording medium, such as that illustrated in FIG. 18, shall be described. The structure is such that a first information layer 1802 containing a phase change recording material, a first intermediate layer 1805 (thickness t1) composed of ultraviolet light-curable resin, a second information layer 1803, a second intermediate layer 1806 (thickness t2), a third information layer 1804, and a protective layer 1809 (thickness tc) are layered in that order upon a resin substrate 1801. The external surface of the protective layer 1809 is referred to as a protective layer surface 1809a.

TABLE 4

| | Thickness Composition (μm) | | | | Jitter (%) | | | | |
|---|---|---|---|---|---|---|---|---|---|
| | 1st | 2nd | 3rd | | | | | | |
| No. | Intermediate Layer t1 (μm) | Intermediate Layer t2 (μm) | Intermediate Layer t3 (μm) | Protective Layer tc (μm) | 1st Information Layer | 2nd Information Layer | 3rd Information Layer | 4th Information Layer | Determination |
| 1 | 23-27 | 10-14 | 18-22 | 43-47 | 6.0 | 8.4 | 8.3 | 7.0 | o |
| 2 | 18-22 | 10-14 | 23-27 | 43-47 | 6.1 | 8.4 | 8.3 | 7.0 | o |
| 3 | 23-27 | 11-15 | 17-21 | 43-47 | 6.0 | 8.2 | 8.1 | 7.1 | o |
| 4 | 17-21 | 11-15 | 23-27 | 43-47 | 6.0 | 8.2 | 8.2 | 7.0 | o |
| 5 | 22-26 | 12-16 | 17-21 | 43-47 | 6.0 | 7.8 | 8.0 | 7.0 | o |
| 6 | 17-21 | 12-16 | 22-26 | 43-47 | 6.1 | 7.8 | 7.9 | 7.0 | o |
| 7 | 22-26 | 11-15 | 17-21 | 44-48 | 6.0 | 8.1 | 8.1 | 7.1 | o |
| 8 | 17-21 | 11-15 | 22-26 | 44-48 | 6.0 | 8.2 | 8.2 | 7.0 | o |
| 9 | 17-21 | 22-26 | 12-16 | 43-47 | 8.9 | 8.2 | 8.1 | 7.2 | x |

In Table 4, the patterns in No. 1-No. 8 have thickness compositions in which back-focus issues of up to three reflections do not occur, whereas No. 9 has a thickness composition in which back-focus issues of three reflections occur.

Looking at the thickness compositions of No. 1-No. 8 in Table 3, when the thickness from the protective layer surface to the first information layer is 102±4 μm, and considering that the second intermediate layer is the thinnest and a thickness variability of ±2 μm is present, the minimum intermediate layer thickness is 10 μm, and the maximum intermediate layer thickness is 27 μm. Furthermore, the minimum protective layer thickness is 43 μm, and the maximum protective layer thickness is 48 μm.

Favorable results were obtained in No. 1 to No. 8, where the thicknesses of the intermediate layers and the thickness of the protective layer all have the desired thickness variability within ±2 μm in that surface, reproducing signal amplitude fluctuations due to back-focus issues do not occur in any of the regions within the surface of the medium, and the target jitter of less than 8.5% was met in all information layers. The conditions of No. 5 and No. 6 in particular allow the second intermediate layer to be designed with a wider thickness of 14±2 μm, which enables the influence of interlayer crosstalk on the jitter values of the second information layer and the third information layer to be reduced; these are therefore extremely desirable compositions.

However, with No. 9, back-focus issues with three reflections, from the third information layer, the protective layer Thickness compositions and recording/reproducing signal properties were evaluated for this optical information recording medium. The necessary conditions are the same as described in the first embodiment; namely, a thickness variability in the intermediate layers and protective layers of ±2 μm, a protective layer thickness of 40 μm or more, a minimum intermediate layer thickness of 10 μm, an interlayer thickness difference of 1.0 μm or more, and an optical path length difference between the information light and the stray light of ±2 μm or more.

Next, the conditions required to set the optical path length difference between the information light and the stray light to ±2 μm or more shall be described.

When focusing recording/reproducing light on an information layer even further than the third information layer (on the side opposite to the light entry side) in an optical information recording medium that has three information layers, stray light problems can occur in the following two patterns. Note that in the following descriptions, the information layer to/from which recording/reproducing is performed shall be called the "recording/reproducing information layer".

The first pattern of stray light problem assumes stray light reflected three times, from an information layer B on the light entry side of the recording/reproducing information layer A→an information layer C further on the light entry side, or the protective layer surface→information layer B, in which case the round-trip optical path length difference between the information light that returns to the optical head from the recording/reproducing information layer A and the aforementioned stray light is less than 2 µm; therefore, interference can occur between the information light and the stray light.

This first pattern of stray light problem is solved by setting the round-trip optical path length difference between the thickness between the recording/reproducing information layer A and the information layer B and the thickness between the information layer B and the information layer C/protective layer surface to a value that exceeds 1 µm. Note that the "thickness" mentioned here refers to the thickness measured by the aforementioned thickness gauge.

To be more specific, when the information layer to be recorded to/reproduced from is the first information layer 1802, it is necessary for the following three patterns to hold true in order to prevent interference between the information light and the stray light.

$$|t1-t2|>1 \text{ µm} \quad\quad 1)$$

(This makes it possible to prevent interference with stray light reflected by the second information layer 1803→the third information layer 1804→the second information layer 1803, in that order.)

$$|t1-(t2+tc)|>1 \text{ µm} \quad\quad 2)$$

(This makes it possible to prevent interference with stray light reflected by the second information layer 1803→the protective layer surface 1809a→the second information layer 1803, in that order.)

$$|(t1+t2)-tc|>1 \text{ µm} \quad\quad 3)$$

(This makes it possible to prevent interference with stray light reflected by the third information layer 1804→the protective layer surface 1809a→the third information layer 1804, in that order.)

When the information layer to be recorded to/reproduced from is the second information layer 1803, it is necessary for the following pattern to hold true.

$$|t2-tc|>1 \text{ µm} \quad\quad 4)$$

(This makes it possible to prevent interference with stray light reflected by the third information layer 1804→the protective layer surface 1809a→the third information layer 1804, in that order.)

The second pattern of stray light problem assumes stray light reflected three times, from an information layer b on the light entry side of the recording/reproducing information layer a→an information layer c further on the light entry side, or the protective layer surface→an information layer d closer to the light entry side than the information layer b and on the side opposite to the light entry side of the information layer c or the protective layer surface, and is solved by reducing the round-trip optical path length difference between the information light returning to the optical head from the recording/reproducing information layer a and the aforementioned stray light to less than 2 µm. Note that stray light reflected three times, from the information layer d→the information layer c or the protective layer surface→information layer b, also occurs in this second pattern, and thus interference is caused by the two light beams.

This second pattern of stray light problem is solved by setting the difference between the thickness between the information layer a and the information b and the thickness between the information layer c and the information layer d/protective layer surface to a value that exceeds 1 µm.

To be more specific, when the information layer to be recorded to/reproduced from is the first information layer 1802, it is necessary for the following pattern to hold true in order to prevent interference between the information light and the stray light.

$$|t1-tc|>1 \text{ µm} \quad\quad 5)$$

(This makes it possible to prevent interference with stray light reflected by the second information layer 1803→the protective layer surface 1809a→the third information layer 1804, in that order, and at the same time prevent interference with stray light reflected by the third information layer 1804→the protective layer surface 1809a→the second information layer 1803, in that order.)

The thickness compositions and recording/reproducing properties of the three-layer optical information recording media of the present fourth embodiment are shown in Table 5.

TABLE 5

| | Thickness Composition (µm) | | | Jitter (%) | | | |
|---|---|---|---|---|---|---|---|
| | 1st | 2nd | | | | | |
| No. | Intermediate Layer t1 (µm) | Intermediate Layer t2 (µm) | Protective Layer tc (µm) | 1st Information Layer | 2nd Information Layer | 3rd Information Layer | Determination |
| 1 | 23-27 | 16-20 | 55-59 | 6.1 | 8.2 | 8.2 | ○ |
| 2 | 23-27 | 18-22 | 53-57 | 6.0 | 8.3 | 8.0 | ○ |
| 3 | 33-37 | 18-22 | 43-47 | 6.0 | 8.1 | 8.1 | ○ |
| 4 | 23-27 | 19-23 | 52-56 | 8.6 | 8.3 | 8.1 | × |
| 5 | 39-43 | 12-16 | 43-47 | 9.1 | 8.4 | 8.3 | × |

Because the surface thickness distribution of each intermediate layer is ±2 µm, the thicknesses fluctuates ±2 µm central to the thickness design values shown in the table. For this reason, the reproducing signal fluctuates significantly in regions in which the thickness within the surface does not meet the aforementioned necessary conditions.

In Table 5, the patterns in No. 1-No. 3 have thickness compositions in which back-focus issues of up to three reflections do not occur, whereas No. 4 and No. 5 have a thickness compositions in which back-focus issues of three reflections occur.

Looking at the thickness compositions of No. 1-No. 3 in Table 5, considering that a thickness variability of ±2 µm is present, the minimum intermediate layer thickness is 12 µm, and the maximum intermediate layer thickness is 37 µm. Furthermore, the minimum protective layer thickness is 43 µm, and the maximum protective layer thickness is 47 µm.

Favorable results were obtained in No. 1 to No. 3, where the thicknesses of the intermediate layers and the thickness of the protective layer all have the desired thickness variability within ±2 µm in that surface, reproducing signal amplitude fluctuations due to back-focus issues do not occur in any of the regions within the surface of the medium, and the target jitter of less than 8.5% was met in all information layers.

However, with No. 4, back-focus issues with three reflections, from the second information layer, the third information layer, and the second information layer, occurred when recording to/reproducing from the first information layer. As a result, the jitter value degraded considerably, exceeding 8.5%. The reason for this is that in the above pattern 4), the value of |t1−t2| is less than 1 µm, and as a result, the optical path length difference between the information light and the stray light is sometimes less than 2 µm.

Furthermore, with No. 5, back-focus issues with three reflections, from the second information layer, the protective layer surface, and the third information layer, occurred when recording to/reproducing from the first information layer. As a result, the jitter value degraded considerably, exceeding 8.5%. The reason for this is that in the above pattern 5), the value of |t1−tc| is less than 1 µm, and as a result, the optical path length difference between the information light and the stray light is sometimes less than 2 µm.

Although these five thickness compositions were evaluated in the present fourth embodiment, the thickness compositions are not limited thereto, and as long as the conditions described in the first embodiment, namely, a thickness variability of ±2 µm in the intermediate layers and protective layer, a protective layer thickness of 40 µm or more, a minimum intermediate layer thickness of 10 µm or more, an interlayer thickness difference of 1.0 µm or more, and an optical path length difference between the information light and the stray light of ±2 µm or more, are met, favorable recording/reproducing properties can be obtained without the occurrence of back-focus issues.

INDUSTRIAL APPLICABILITY

The optical information recording medium of the present invention, implemented as a four-layer optical information recording medium composed of four information layers, is capable of reducing the influence of interlayer crosstalk while maintaining compatibility with conventional single- and dual-layer optical information recording media, and can eliminate back-focus issues caused by interference between the information light and reflected stray light, in which some of the stray light reflected by other information layers when light is focused onto one of the information layers is reflected up to three times by other information layers or the protective layer surface and returns to the optical head, while affording a process margin sufficient for manufacturing intermediate layers, a protective layer, and so on.

The present invention can be used in high-capacity multi-layer optical information recording media capable of recording/reproducing a high-quality signal.

The invention claimed is:

1. An optical information recording medium comprising:
at least three information layers;
at least two intermediate layers separating the information layers; and
a protective layer,
wherein the information layers, the intermediate layers and the protective layer are layered upon a substrate,
wherein the optical information recording medium is recorded onto and/or reproduced from, from a side of the protective layer using an optical head,
wherein a difference between a round-trip optical path length of information light returning to the optical head from one of the information layers upon which recording/reproducing light is focused and a round-trip optical path length of reflected stray light that is a part of stray light (i) reflected by one of the information layers and that returns to the optical head and (ii) having been reflected by the information layer or a surface of the protective layer no more than three times is no less than 2 µm and no more than 146 µm,
wherein the round-trip optical path length of the information light is an optical path length from where the information light enters the surface of the protective layer to where the information light exits the surface of the protective layer, and
wherein the round-trip optical path length of the reflected stray light is an optical length from where the reflected stray light enters the surface of the protective layer to where the reflected stray light exits the surface of the protective layer.

2. The optical information recording medium according to claim 1, wherein a sum of thicknesses of the intermediate layers differs from a thickness of the protective layer.

3. The optical information recording medium according to claim 1, wherein thicknesses of each of the intermediate layers and the protective layer differ from one another, and a difference between each thickness of each of the intermediate layers and the protective layer is no less than 1 µm.

4. The optical information recording medium according to claim 1, wherein a thickness variability of each of the intermediate layers is within ±2 µm.

5. The optical information recording medium according to claim 1, comprising:
a first information layer provided upon the substrate;
a first intermediate layer provided upon the first information layer;
a second information layer provided upon the first intermediate layer;
a second intermediate layer provided upon the second information layer;
a third information layer provided upon the second intermediate layer;
a third intermediate layer provided upon the third information layer; and
a fourth information layer provided upon the third intermediate layer,
wherein the protective layer is provided upon the fourth information layer, and
wherein the second intermediate layer is a thinnest layer of the first through third intermediate layers.

6. The optical information recording medium according to claim 1, comprising:
a first information layer provided upon the substrate;
a first intermediate layer provided upon the first information layer;
a second information layer provided upon the first intermediate layer;
a second intermediate layer provided upon the second information layer; and
a third information layer provided upon the second intermediate layer,
wherein the protective layer is provided upon the third information layer, and
wherein the second intermediate layer is thinner than the first intermediate layer.

7. The optical information recording medium according to claim 6, wherein a thickness of each intermediate layer is no less than 16 µm and no more than 37 µm.

8. The optical information recording medium according to claim 6, wherein a thickness of the protective layer is no less than 43 μm and no more than 59 μm.

9. The optical information recording medium according to claim 6, wherein a thickness of the first intermediate layer is no less than 23 μm and no more than 27 μm, a thickness of the second intermediate layer is no less than 16 μm and no more than 20 μm, and a thickness of the protective layer is no less than 55 μm and no more than 59 μm.

10. The optical information recording medium according to claim 6, wherein a thickness of the first intermediate layer is no less than 23 μm and no more than 27 μm, a thickness of the second intermediate layer is no less than 18 μm and no more than 22 μm, and a thickness of the protective layer is no less than 53 μm and no more than 57 μm.

11. The optical information recording medium according to claim 6, wherein a thickness of the first intermediate layer is no less than 33 μm and no more than 37 μm, a thickness of the second intermediate layer is no less than 18 μm and no more than 22 μm, and a thickness of the protective layer is no less than 43 μm and no more than 47 μm.

12. The optical information recording medium according to claim 6, wherein a difference between a thickness of the first intermediate layer and a thickness of the second intermediate layer is more than 1 μm.

13. The optical information recording medium according to claim 6, wherein a difference between a thickness of the first intermediate layer and a total thickness of the second intermediate layer and the protective layer is more than 1 μm.

14. The optical information recording medium according to claim 6, wherein a difference between a total thickness of the first and second intermediate layers and a total thickness of the protective layer is more than 1 μm.

15. The optical information recording medium according to claim 6, wherein a difference between a thickness of the second intermediate layer and a thickness of the protective layer is more than 1 μm.

16. The optical information recording medium according to claim 6, wherein a difference between a thickness of the first intermediate layer and a thickness of the protective layer is more than 1 μm.

17. The optical information recording medium according to claim 1,
wherein the information layers comprise an information layer A, an information layer B provided on a light entry side of the information layer A, and information layer C provided on a light entry side of the information layer B, and
wherein a thickness between the information layer A and the information layer B and a thickness between the information layer B and the information layer C or the surface of the protective layer are different by more than 1 μm.

18. The optical information recording medium according to claim 1,
wherein the information layers comprise an information layer a, an information layer b provided on a light entry side of the information layer a, an information layer c provided on a light entry side of the information layer b, and an information layer d provided on a light entry side of the information layer c, and
wherein a thickness between the information layer a and the information layer b and the thickness between the information layer c and the information layer d or the surface of the protective layer are different by more than 1 μm.

19. The optical information recording medium according to claim 1, wherein the recording and/or reproducing is performed using the optical head including at least a laser light source having a wavelength of no less than 400 nm and no more than 410 nm, an objective lens having an NA of 0.85, and a spherical aberration correction element.

* * * * *